United States Patent [19]

Evers

[11] Patent Number: 5,073,955
[45] Date of Patent: Dec. 17, 1991

[54] METHOD FOR RECOGNIZING PREVIOUSLY LOCALIZED CHARACTERS PRESENT IN DIGITAL GRAY TONE IMAGES, PARTICULARLY FOR RECOGNIZING CHARACTERS STRUCK INTO METAL SURFACES

[75] Inventor: Christian Evers, Baldham, Fed. Rep. of Germany

[73] Assignee: Siemens Aktiengesellschaft, Munich, Fed. Rep. of Germany

[21] Appl. No.: 521,014

[22] Filed: May 9, 1990

[30] Foreign Application Priority Data

Jun. 16, 1989 [DE] Fed. Rep. of Germany ....... 3919831

[51] Int. Cl.$^5$ .......................... G06K 9/00; G06K 9/48
[52] U.S. Cl. ......................................... 382/21; 382/22; 382/14
[58] Field of Search .................. 382/21, 22, 14, 27

[56] References Cited

U.S. PATENT DOCUMENTS

| | | | |
|---|---|---|---|
| 3,609,685 | 9/1971 | Deutsch ................................. | 382/21 |
| 4,566,124 | 1/1986 | Yamamoto et al. ................. | 382/22 |
| 4,817,184 | 3/1989 | Thomason et al. .................. | 382/22 |

OTHER PUBLICATIONS

"Thinning Algorithms", Chapter 9, in Algorithms for Graphics & Image Processing, Springer 1982, pp. 195-215.
"Forward/Backward Contour Tracing with Feedback", by Bor-Dong Chen & Pepe Siy, IEEE PAMI-9, May 1987, pp. 438-446.
"Picture Analysis in Character Recognition in Digital Picture Analysis" by J. R. Ullmann, edited by A. Rosenfeld, Springer, 1976, pp. 295-343.
"Stamped Character Apparatus Based on the Bit Matrix Method" by Y. Hongo & A. Komuro, Proc. 6th ICPR, Muenchen 1982, pp. 448-450.
"Font and Size-Invariant Character Recognition with Gray Value Image Features": by S. Holder & J. Dengler, Proc. 9th ICPR, Rom, 1988, pp. 252-254.

*Primary Examiner*—Leo H. Boudreau
*Assistant Examiner*—David Fox
*Attorney, Agent, or Firm*—Hill, Van Santen, Steadman & Simpson

[57] ABSTRACT

A method for recognizing previously localized characters present in digital gray tone images, particularly for recognizing characters struck in metal surfaces, whereby, for training a trainable character recognition routine, steps are provided to generate reference characters presented line-like and to deposit these reference characters in a working memory of the trainable character recognition routine, whereby the number and nature of the reference characters correspond to the character set from which characters are to be recognized. For recognizing characters, steps are provided: to read the digitized character of the localized character to be recognized into a character recognition routine and an appertaining gray tone image is provided, to pre-process the character to be recognized so that a classification of the appertaining character can be implemented; to compare the preprocessed character to all reference characters previously learned by the character recognition routine, to implement a majority decision for identifying that reference character that has the greatest plurality of sub-features coinciding with the character to be recognized, and to produce a result signal from the character recognition routine for further processing thereof.

15 Claims, 12 Drawing Sheets

METHOD FOR RECOGNIZING PREVIOUSLY LOCALIZED CHARACTERS PRESENT IN DIGITAL GRAY TONE IMAGES, PARTICULARLY FOR RECOGNIZING CHARACTERS STRUCK INTO METAL SURFACES

BACKGROUND OF THE INVENTION

Manufactured products are frequently provided with legends that serve to identify the product. Such identifications, for example, are directed to particulars such as article number, manufacturer and type of execution.

Legends applied with color stamps are often too temporary since they become easily illegible due to scratches, rust or foreign colored materials, such as lacquer. Coined legends prove more durable and, for example, are frequently employed in the field of automobile manufacture. A distinction is made in coined characters between imaged or struck legends and raised legends.

Although a bar code can be automatically read more easily than such characters, it is seldom used since the identifications could also be easily read by other persons. There is therefore a great need for a method that recognizes coined characters in automated production processes.

Optical character recognition (OCR) is well known in the prior art for pattern recognition of digital image processing. For example, optical reader equipment are already used in banks and in post offices, see, for example, Ullmann, J.R., Picture Analysis in Character Recognition in Digital Picture Analysis, Edited by A. Rosenfeld, Springer 1976, pages 295-343. They have different requirements concerning the print image to be read and of the text layout. However, what they all have in common is that they expect characters that noticeably differ from the picture background in terms of color or brightness.

This pre-requisite is generally not met for characters coined in workpieces. Depending on the type of coining, on the illumination, on the material of the surface and any possible contamination of the workpiece, the labelling thereon does not uniformally contrast with the background. Consequently, a binary image is not available, only a digital gray tone image is available and therefore known methods for optical character recognition cannot be employed.

FIG. 1 shows portions of gray tone images of punched characters that were recorded under different illumination conditions.

Two sub-tasks form the foundation for the process of optical character recognition in gray tone images, namely, first segmenting for identifying at which locations characters are present in the image, and second classifying or recognition. For example, let a rectangle in which a character is assumed to reside be extracted from the image. A determination must then be made as to which character is present or, as warranted, whether a missegmenting was carried out.

Complete systems for character segmenting and recognition in gray tone images are disclosed in the publications of Hongo, Y., Komuro, A., "Stamped Character Apparatus Based on the Bit Matrix Method", Proc. 6th ICPR, Muenchen 1982, pages 448-450; German published application 3 203 897; and Langer, W., "Segmentierung von Schriftzeichen in Grauwertbildern", Degree Thesis, Technical University of Braunschweig Inst. fuer Elektrotechnik, 1988. All three systems employ methods that first convert the gray tone image into a black-and-white picture and then execute the segmenting and recognition.

In the references of Hongo and Komuro the original image is converted into a binary representation by establishing a gray tone threshold and then by assuming the characters have a planar structure with small disrupting areas. The latter are then eliminated by evaluating their size. The method is not suitable for recognizing coined characters without an additional application of color. However this method can be used, for example, for automobile identifications and labelled keyboards. The same is true of the method disclosed by German published application 3 203 897.

In the reference of Langer the disclosed method also segments the characters in the binary image, whereby, however, it is proposed to use alternative segments in the case of an unclear classification. The binary segmented characters are pre-processed in order to produce planar patterns. A method of CGK (Computer Gesellschaft Konstanz) is used for classification that recognizes planar binary characters. The main drawback of the Langer method is the selection of parameters dependent on the original image and the selection of the sub-steps for image pre-processing. Moreover, the classification by the CGK method requires an exact segmenting of the binary characters in a rectangle. Given the presence of disrupting areas, this cannot be guaranteed in every case.

European Patent 0 217 118 A2 discloses a method for segmenting wafer numbers from gray tone images. According to this method, the original image is first "smoothed" and is then converted into a black-and-white image with reference to a global threshold. Using a single-pass method, the components of the image are coded into simple polygon trains ("descriptors"). Maximum expanses are calculated for every polygon train and small noise elements are eliminated on the basis of the resulting values. An individual character segmenting and a classification are not disclosed. The extremely narrow coining of the wafer numbers facilitates the segmenting significantly since the characters themselves are not subject to any brightness fluctuations (no reflections). Without such specific, prior knowledge about the image, an image smoothing is generally not recommended since features important for the classification can also be lost in addition to any disruptions of the image.

A method for the classification of characters from "DMA sequences" is disclosed in the publication by Holder, S., Dengler, J., "Font and Size-Invariant Character Recognition with Gray Value Image Features", Proc. 9th ICPR, Rom, 1988, these sequences are composed of the leters "A", "C", "G" and "T" and are usually printed in an extremely small type face with poor printing quality and a variable character set in trade publications. The method employs the gradient image of the digitized gray tone image for acquiring the features since a good binarization can generally not be achieved by establishing a gray tone threshold due to the poor quality of the original image. The gradient directions and their directional changes in the course of the contour of the letters presented are entered into a histogram. The histogram is compared to reference histograms of the four letters that were previously produced on the basis of sample letters from various character sets. The method works in size-invariant fashion and nearly independently of the character set of the original. A method for segmenting is not disclosed. The algorithm used is not suitable for punched characters since the important information about th original changes of the gradients in the course of the contours of the characters is not reliably present for these characters. For example, an "L" could thus not be discriminated from a "T" merely with reference to the gradient histogram.

SUMMARY OF THE INVENTION

An object of the present invention is to provide a method for the classification of previously localized characters present in gray tone images that is suitable for reliably recognizing characters punched o struck in workpieces or fashioned as raised characters on workpieces recognizing these under arbitrary illumination conditions.

For achieving this object, the method of the present invention for recognizing previously localized characters present in digital gray tone images, particularly for recognizing characters struck into metal surfaces, is as follows. For training a trainable character recognition means the following steps are performed: generate reference characters (ideals) portrayed line-like and deposit these reference characters in a working memory of the trainable character recognition means, whereby the number and nature of the reference characters correspond to the character set from which characters are to be recognized; assign a direction to every pixel of every reference character; determine a scatter function for anticipated values; determine an angular comparison function for comparing reference directions with gray tone edge directions identified from the gray tone image; produce evaluation matrices on the basis of the scatter function and the angular comparison function. For recognizing characters, the following steps are performed: read the digitized character to be recognized into a character recognition means, as a result whereof the appertaining gray tone image is obtained; preprocess the character to be recognized so that a classification of the appertaining character ca be implemented; compare the pre-processed character to all reference characters previously learned by the character recognition means; implement a majority decision for determining which reference character coincides with the greatest plurality of sub-features of the character to be recognized; and generate a result signal from the character recognition means for further processing.

The generated result signal is subjected to a plausibility check and a signal that represents a rejection criteria is generated when a positive check result is not obtained.

The rejection criterion is established when at least one of the following two conditions is met:
1) a value Vgl(B)/AV is smaller than a threshold Rs1, whereby B is the result character of a classification and AV is the number of foreground points of the appertaining, binarized gradient image;
2) the minimum distance of the obtained evaluation of the result character B to other characters is lower than a threshold Rs2.

The distance function for the condition "2" is established by the following relationship:

$$g(Vgl(A), Vgl(B)) := \frac{|Vgl(A) - Vgl(B)|}{|Vgl(A)| + |Vgl(B)|}$$

The character to be recognized is further-processed in a rectangle segmented from the gray tone image. The intensity and direction of a potential gray value edge in the rectangle is first calculated for every point of this rectangle with a gradient filter. The orientation of the gray value edges ("from bright to dark" or "from dark to bright") is not discriminated, since which of the coined edges in the gray tone image appear bright and which appear dark cannot be predicted for an unknown illumination direction.

In one embodiment of the present invention a compass gradient filter is used as a gradient filter. The gradient image present after the gradient filtering is transformed into a binary image and pixels having weak gradient values are erased. The binarized gradient image is transformed to a format "RefBreite*RefHöhe" of the reference characters. Specific steps of the comparison procedure can be executed either sequentially or in parallel.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Before the character recognition means can be used for recognition, it must be trained in a learning phase. In this learning phase, the character set to be learned is presented to the system. The typical scope of such a character set lies between five and 35 different characters. The characters are frequently composed only of numbers (i.e. a maximum of 10 characters). "Evaluation matrices" are automatically generated for every character, these being stored and used subsequently in a recognition phase.

Figure 1:
FIG. 1 depicts portions of gray tone images of punched characters that were registered under different illumination conditions, showing these as a laser printout.
Figure 2:
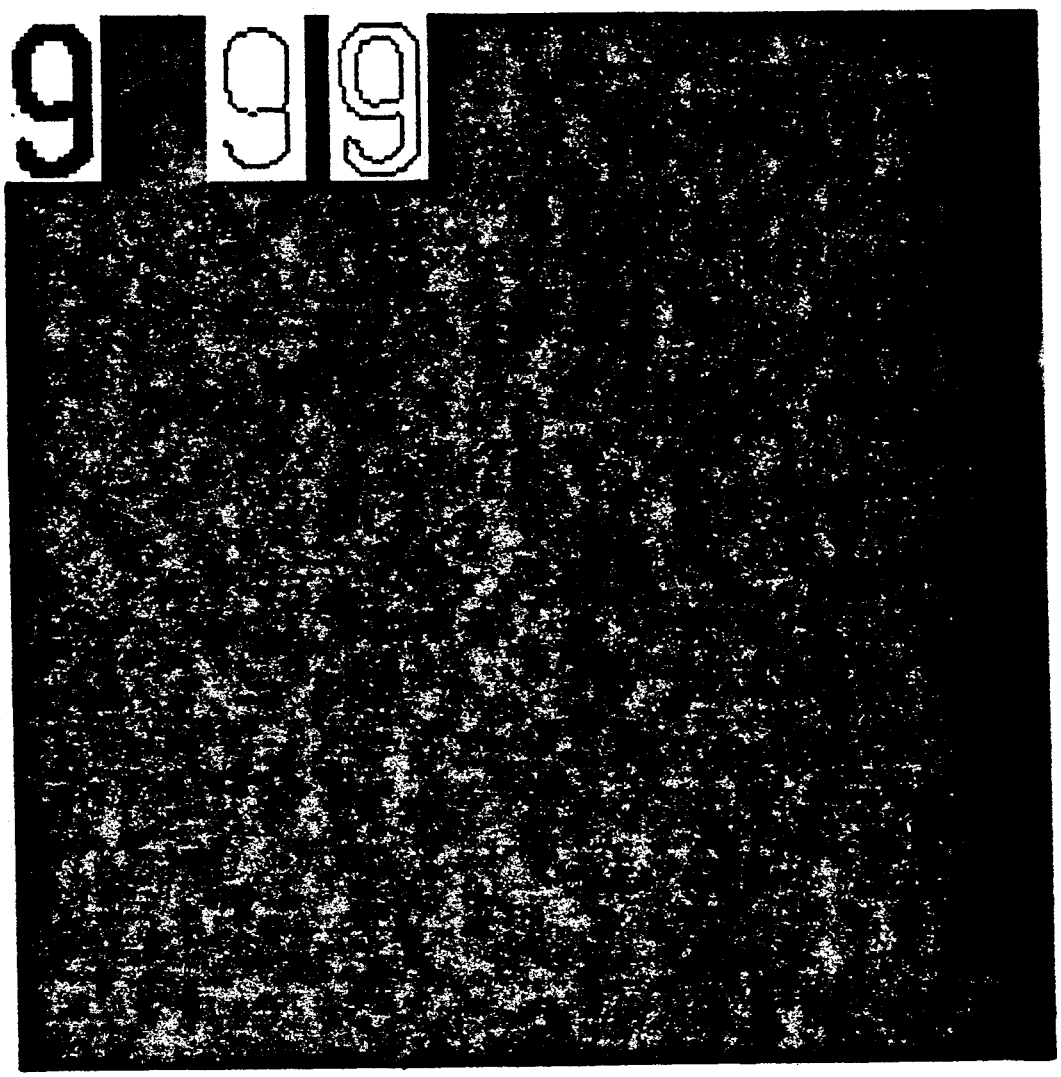
FIG. 2 shows examples of reference characters for the numeral "9"

Line-like images of the stamping punch are used as reference characters for the "training" of the character recognition means. The coining edge of the punch should thereby be portrayed. FIG. 2 shows examples of reference characters of the numeral "9". A reference character for an extremely narrow stamping punch is shown in the middle and that for a broader stamping punch is shown at the right.

Figure 3:
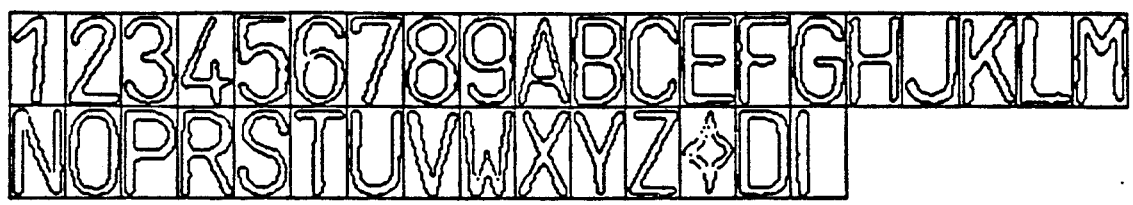
FIG. 3 shows a set of 35 reference characters that are transformed into a prescribed reference format.

The reference characters must be produced by the user of the character recognition means. This can be accomplished using a simple CAD system, a light pen or using parametric input. However, it is also possible to prepare a drawing and to then digitize the drawing. The line-like references of FIG. 2 were acquired, for example, from the binary image shown at the left in the FIG. 2. All reference characters are transformed by the character recognition means to the same format of a predetermined width and to a predetermined height, hereinafter referred to as "RefBreite*RefHöhe". FIG. 3 shows a set of 35 reference characters in the format of 24*40 pixels.

Figure 4A:
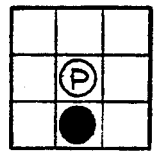
FIGS. 4a–4c are illustrations of various classes of black point arrangement in reference characters.
Figure 4B:
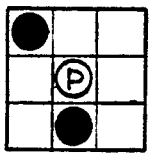
Figure 4C:
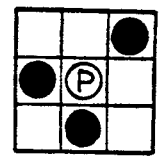

The reference characters are present in binary images (only composed of black and white points). A thinning method is applied in order to thin the lines of the reference characters to a minimum width ("One-Pixel-Width"). A definition of the term "thin" and a few thinning methods may be found in the book, Pavlidis, Th., Algorithms for Graphics and Image Processing, Springer 1982, Pages 195-214 (hereby incorporated by reference). The thinned reference characters are then stored. The black points (P), see FIG. 4, of the references can now be categorized into three classes:

a) end points (a black neighboring point in a 3×3-environment),
b) line points (exactly two black neighboring points), and
c) branching points (more than two black neighboring points), see FIG. 4.

An edge direction is assigned to the points of the reference character. Various methods can be employed for this purpose.

Figure 5A:
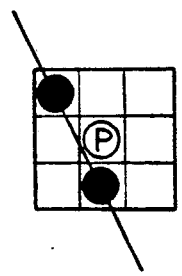
FIGS. 5a–5c show possibilities of assigning directions to line points of a reference character.
Figure 5B:
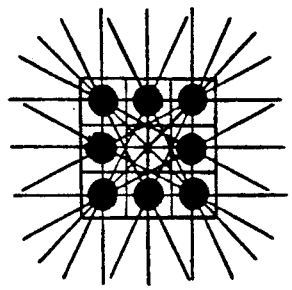
Figure 5C:
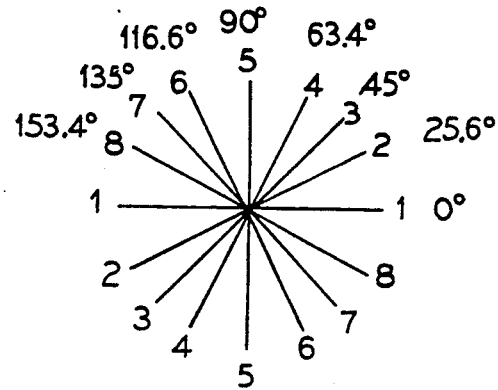

One possibility of assigning a direction to the line points of a reference character is shown in FIG. 5. From left to right, FIG. 5 shows:

a) the direction of the connecting straight line of the neighboring points being the direction assigned to P;
b) the connecting straight lines therewith possible in 3×3 window;
c) the eight possible directions with numbering and specification of the angle.

The directional straight lines here contain no running sense, that is, the directions "north" and "south" are identical. End points and branching points receive no assigned direction.

Let $R_{Ref}$ reference the resolution of the direction detection in the reference character (in the example of FIG. 5, $R_{Ref}=8$).

Since the edge direction measured in the reference character need not also appear at the same location in the gray tone image presented later for recognition, a scatter function is employed. It distributes the anticipation of specific edge directions to an environment of the point at which this direction was measured in the reference.

Let the function be referenced d(P, Q), whereby P is a point in the reference character and Q is a location in a matrix (Evaluation matrix). The function d(P, Q) should not be equal to 0 only for Q in a small environment of P, and the values of d(P, Q) should drop monotonously when Q moves away from P.

The following is a simple example of a scatter function: What are depicted are the values in a 9*9 environment of a point P. The value d(P, Q)=3 is reached for Q=P. The values that are not shown are defined as zero.

```
1 1 1 1 1 1 1 1 1
1 1 1 1 1 1 1 1 1
1 1 2 2 2 2 2 1 1
1 1 2 2 2 2 2 1 1
1 1 2 2 3 2 2 1 1
1 1 2 2 2 2 2 1 1
1 1 2 2 2 2 2 1 1
1 1 1 1 1 1 1 1 1
1 1 1 1 1 1 1 1 1
```

(for use of the scatter function, see below.)

An angular comparison function $h(r_{Ref}, R_{Vor})$ is used to compare an edge direction $r_{Ref}$ measured in a reference character to a defined direction $r_{Vor}$ in the gray tone image. It should output high positive values for a slight angular difference between directions and should output zero for a great angular difference.

Figure 6:
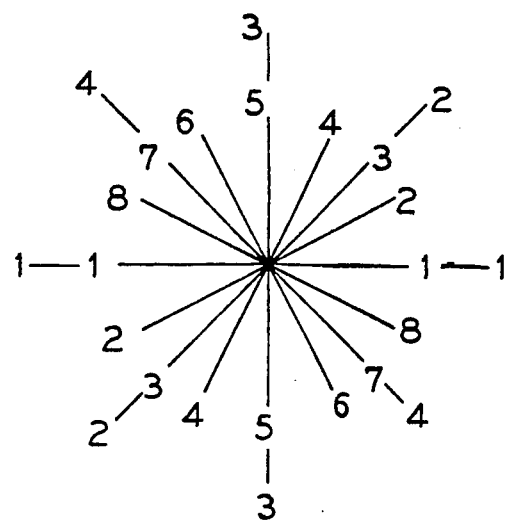
FIG. 6 shows the eight possible directions of the points of a reference character based on the directional definition of FIG. 5.

FIG. 6 shows the eight possible directions of the points of a reference character according to the directional definition of FIG. 5. The forward directions that can be defined by a compass gradient operator in the gray tone image are shown at the outside.

A simple angular comparison function for this specific case can then be defined, for example, by:

$$h((r_{Ref}, r_{Vor})) = \begin{cases} 4, & \text{falls } *(r_{Ref}, r_{Vor}) = 0° \\ 3, & \text{falls } *(r_{Ref}, r_{Vor}) < 45° \\ 1, & \text{falls } *(r_{Ref}, r_{Vor}) = 45° \\ 0, & \text{falls } *(r_{Ref}, r_{Vor}) > 45° \end{cases}$$

An evaluation matrix is produced for every character to be learned and for every possible edge direction in the gray tone image. When, for example, the directional resolution in the gray tone image is $R_{Vor}=4$, then four matrices are produced for each character to be learned. These matrices are the actual result of the overall learning step. The line-like reference characters ar only required for producing these matrices.

How a defined, presented edge direction is to be evaluated with reference to a learned character is entered into the evaluation matrices. The evaluation matrix for vertical edge directions in the middle of the rectangle for the character "1" contains, for example, a high positive value, but contains a negative value for the character "8".

The evaluation matrices are referenced Bew(Z, $r_{Vor}$), whereby Z is a character to be learned. The evaluation matrices have the same format as the learned character, "RefBreite x RefHöhe". Let $W_{Ref}$ indicate the value range for points of a rectangle having this size and let C reference a positive constant that serves the purpose of defining a maximum value for the evaluation.

The evaluation matrices for the character Z are now produced in the following way:

Set Bew(Z,$r_{Vor}$,P):=0 for all directions $r_{Vor}$ and all points P;

Add the value d(P,Q)*h($r_{Ref}$,$R_{Vor}$) to Bew(Z,$r_{Vor}$), for all foreground points P of the thin ideal of Z, for all possible $r_{Vor}$ and every point Q from $W_{Ref}$, whereby $r_{Ref}$ is the direction belonging to P (for the definition of the functions d and h, see above);

Set Bew(Z,$r_{Vor}$):=MIN (C, Bew (Z, $r_{Vor}$)) for all possible $r_{Vor}$ and every point Q from $W_{Ref}$ (MIN=selection of the minimum);

Calculate the mean value over all elements of the evaluation matrices of Z:

$$Bew(Z) := \frac{\sum_{r=1}^{R_{Vor}} \sum_{Q \in W_{Ref}} Bew(Z,r,Q)}{RefBreite \times RefHöhe \times R_{Vor}}$$

for norming, subtract this mean value from all elements of the evaluation matrices of Z.

Figure 7:
FIG. 7 shows the reference character for the numeral "9"
Figure 8:
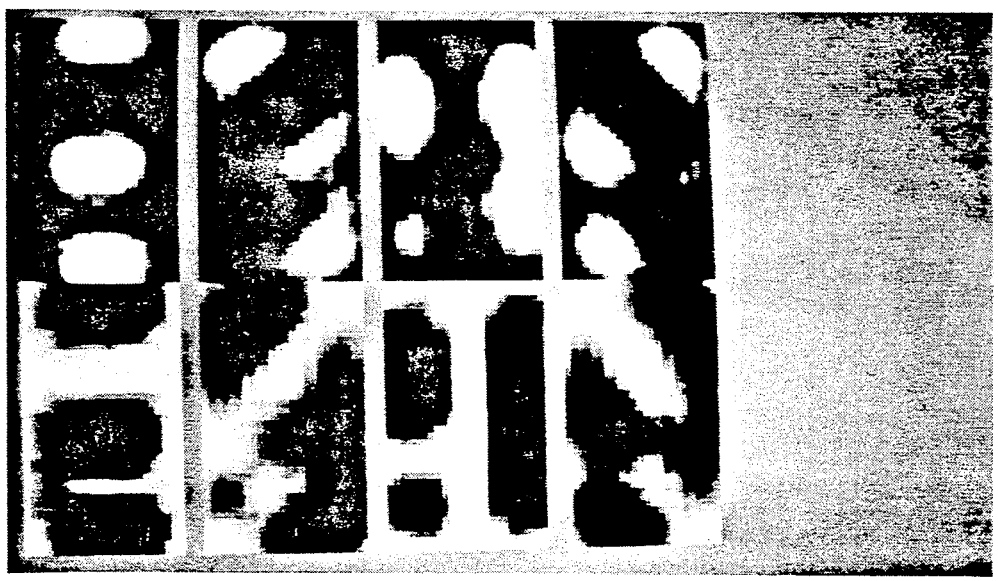
FIG. 8 shows the evaluation matrices produced for the reference character shown in FIG. 7.

FIG. 8 shows the evaluation matrices for the reference shown in FIG. 7 for a "9". The reference matrices for the directions "horizontal", "ascending diagonal", "vertical" and "descending diagonal" are shown from left to right. Dark gray tones correspond to high evaluations. The respectively upper matrix shows the positive elements of the evaluation matrix, that is, negative elements are left light in the upper matrix and are entered in the lower matrix.

The evaluation matrices were calculated with the above-described, exemplary examples, i.e., in particular with RefBreite=24, RefHöhe=4, $R_{Ref}$=8, $R_{Vor}$=4.

The character to be recognized is presented in a rectangle segmented from the gray tone image. The intensity and direction of a gray tone edge potentially occurring here is first calculated for every point of this rectangle with a gradient filter. Since, given an unknown illumination direction, it cannot be predicted which coined edges will appear bright in the image and which will appear dark in the image, no discrimination is made regarding the orientation of the gray value edges ("from bright to dark" or from "dark to bright").

For example, the compass gradient filters can be used as disclosed in the publication of Wirtz, B. "Untersuchung von Algorithmen zur Kantenerkennung in industriellen Szenen", Degree Thesis in Computer Science at the RWTH Aachen, 1987, i.e., for example, the Kirsch, Prewitt or Robinson Masks as well as the non-orthogonal masks presented by Wirtz. Filter makes that are known in the prior art and, other than that disclosed in the thesis by Wirtz, that can be used as equally well in the method of the present invention are disclosed in the following publications:

J.M.S. Prewitt, 1972, "Parametric and Non-Parametric Recognition by Computer: An Application to Leucocyte Image Processing", Adv. in Computers, Vol. 12, pgs. 285-414;

G. Robinson, 1977, "Edge-Detection by Compass Gradient Masks", Computer Vision Graphics and Image Proc., Vol. 6, No. 5, pgs. 492-501; and R. Kirsch, 1971, "Computer Determination of the Constituent Structure of Biological Images", Biomed. Res., Vol. 4, No. 3, pgs. 315-328.

A resolution of four edge directions is obtained by use of these methods: "vertical", "ascending diagonal", "horizontal" and "descending diagonal".

Figure 9:
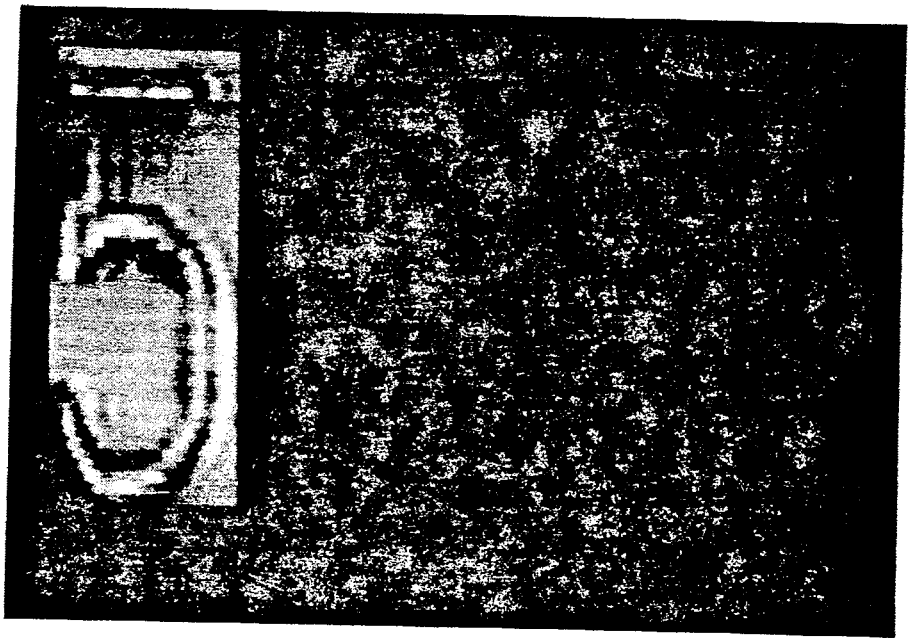
FIG. 9 shows a segmented gray tone image of the numeral "5"
Figure 10:
FIG. 10 shows the character of FIG. 9 filtered with what is referred to as a Robinson mask.

The character of FIG. 9 filtered with the Robinson mask is shown in FIG. 10. Pronounced gray valued transitions in the original image are thereby marked with bright gray values. The allocated edge directions are not shown. The edge directions are numbered beginning with one and the resolution is referenced $R_{Vor}$. Use of gradient filters having a resolution differing from 4 is possible.

Figure 11:
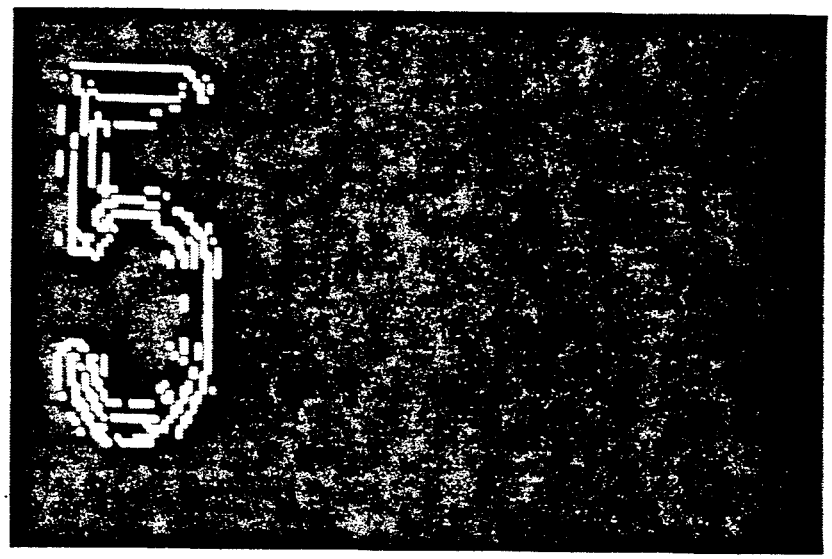
FIG. 11 shows the binarized gradient image of the character filtered out and acquired according to FIG. 10.

The gradient image is subsequently transformed into a binary image and points having weak gradient values are erased. Various methods can be employed in the binarization. FIG. 11 shows the binarized gradient image of the FIG. 10 character using a binarization according to the publication of Chen, D., Siy, P., Forward/Backward Contour Tracing With Feedback, IEEE PAMI-9, May 1987, Pages 438-446 (hereby incorporated by reference). The binary image generally has relatively poor quality and, in particular, it does not appear "planar" but rather it is composed of small strokes and points. It is therefore not suitable for submission to a standard character recognition method (for font and paper originals).

Figure 12:
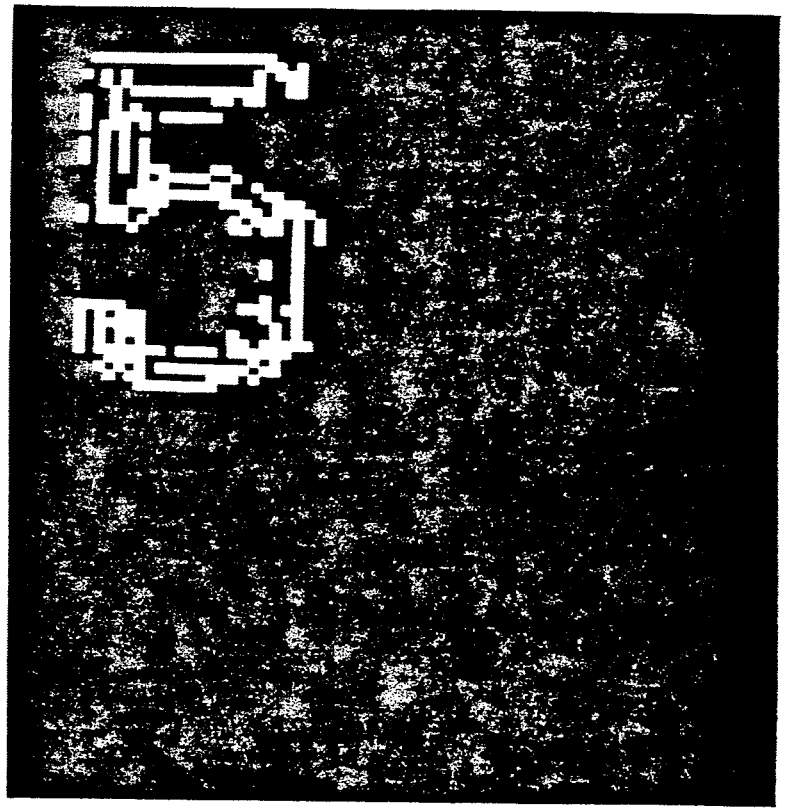
FIG. 12 shows the character image of FIG. 11 demagnified to 24*40 pixels.

Finally, the binarized gradient image is also transformed onto the format, "RefBreite*RefHöhe", of the reference characters. FIG. 12 shows the image of FIG. reduced to 24*40 pixels.

The foreground points thereby continue to carry the information about their appertaining edge direction. Now, let V(r,P) be equal to 1, when the point P is a foreground point in the binarized gradient image and has the direction r; otherwise, let V(r,P) be equal to 0.

For comparing the original to a learned character Z, all the evaluations that correspond to foreground points in the binarized gradient image are summed:

$$Vgl(Z) := \sum_{r=1}^{R_{Vor}} \sum_{P \in W_{Ref}} Bew(Z,r,P) \times V(r,P)$$

For classification, the original is compared to all learned characters. That reference character that yields the highest comparison value is a result character of the classification (majority decision).

The critical advantage of this comparison method is that it operates without multiplication since the factor V(r,P) can only assume the values "0" and "1". Moreover, steps in the procedure can be performed in parallel in a simple way on corresponding hardware, that is, the steps can be chronologically executed in parallel.

In case of a mis-segmenting, i.e. when none of the learned characters was present, or when the quality of the original image is too poor, a criterion for rejecting the character is formed (plausibility check).

An original is rejected when at least one of the following two conditions is met:

1. The value Vgl(B)/AV is smaller than a threshold RS1, whereby B is the result character of the classification and AV is the number of foreground points of the appertaining, binarized gradient image. (The evaluation per pixel of the original that is achieved on average is too low with respect to the most similar, learned character.)

2. The minimum difference of the achieved evaluation of B from the other characters is lower than a threshold RS2. A possible distance function for condition 2 is established by:

$$g(Vg1(A),Vg1(B)) := \frac{|Vg1(A) - Vg1(B)|}{|Vg1(A)| + |Vg1(B)|}$$

Figure 13:
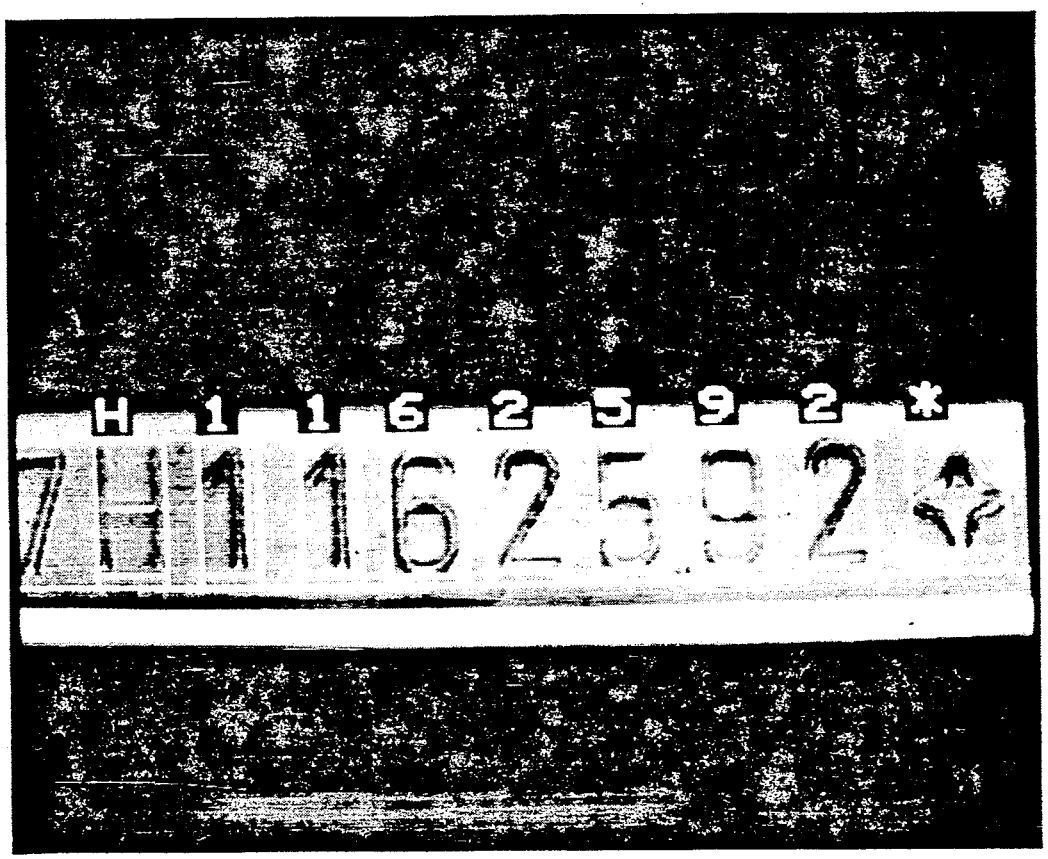
FIGS. 13, 14, and 15 each respectively show exemplary results of the character r Ⓡcognition, whereby the characters shown in FIG. 3 were used as reference characters.
Figure 14:
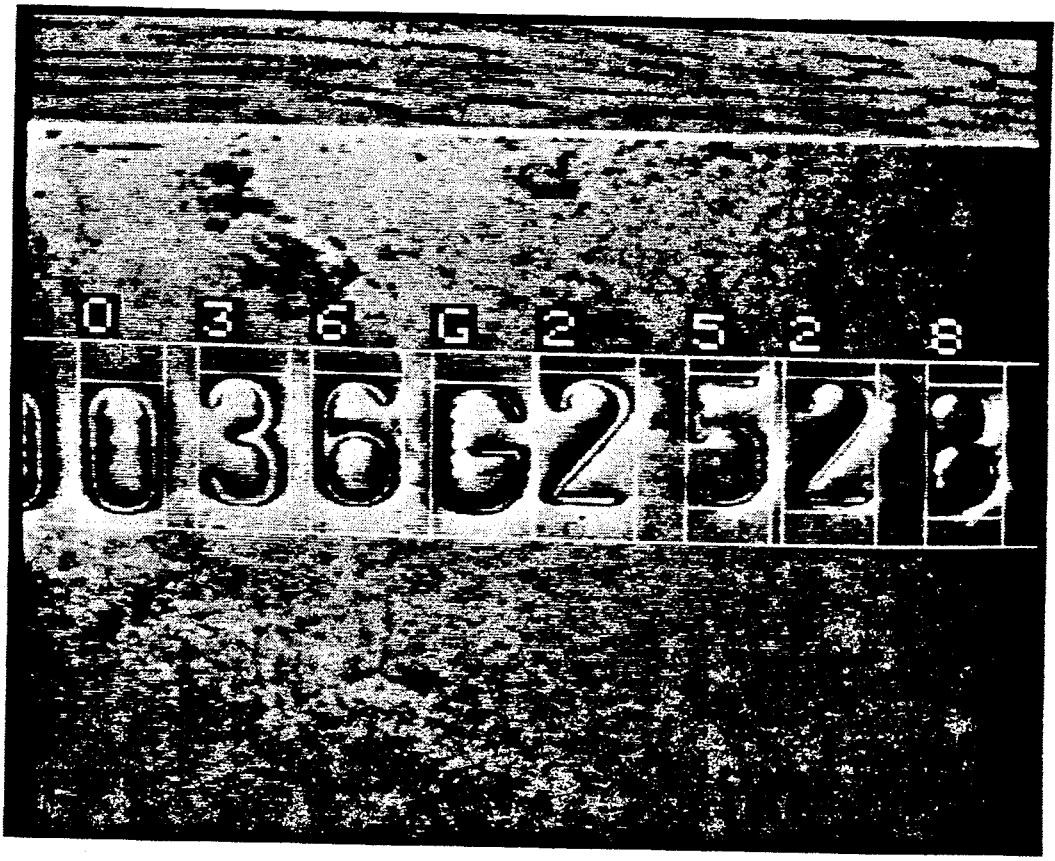
Figure 15:
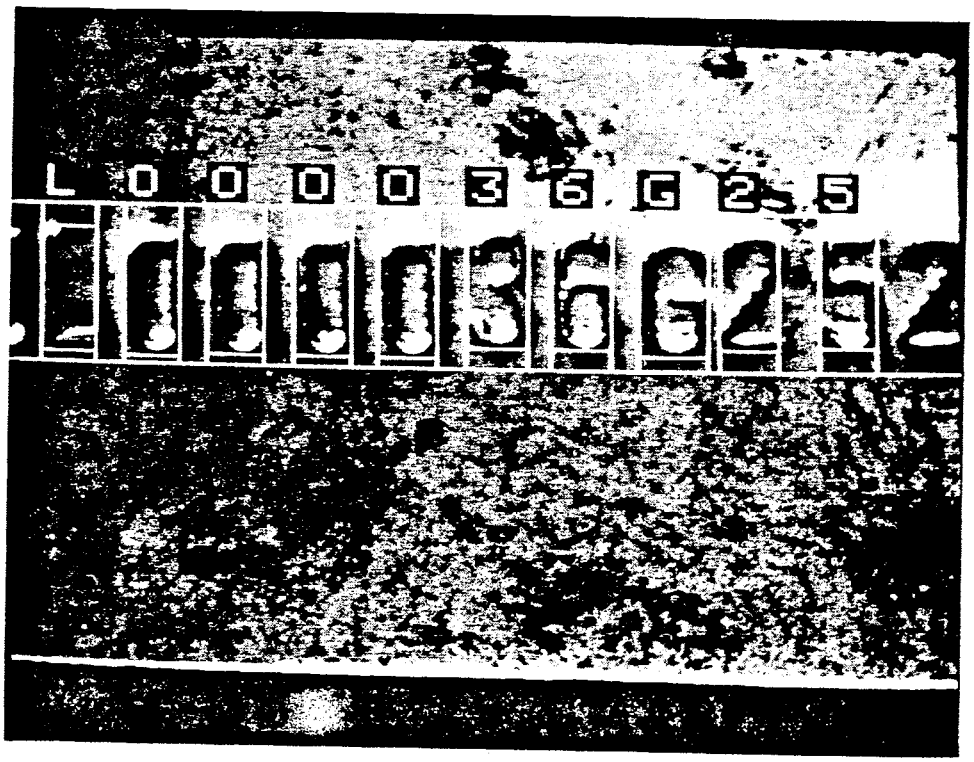

FIGS. 13, 14 and 15 show exemplary results of the recognition. The characters shown in FIG. 3 were used as reference characters. The characters in the gray tone image were automatically segmented and rectangles, presented for recognition, are framed.

The results show the independence of the recognition from the illumination that clearly differs in the three images. Extremely similar characters such as "6" and "G" were also correctly recognized.

In conclusion, one skilled in the art would recognize that the method is also suitable for the recognition of characters on paper originals since edge directions can be identified with gradient filters for binary images as well as for gray tone images.

The attached program printout contains instructions for training reference characters as well as instructions for classification in gray tone images of segmented characters. The implementation was executed on a VAX 8700 and the software was written in the "PASCAL" programming language.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

```
{---------------------------------------------------------------

HAUPTPROGRAMM ZUR ERKENNUNG VON GEPRAEGTEN SCHRIFTZEICHEN.'

------------------------------------------------------------}

VAR
   ZWZEIT            : INTEGER;
   NAME1             : TNAME;

BEGIN  { ****** MAIN ******** }
     WRITE('AUSGABE AUF RAMTEK (T/F) ? ');
     READLN(RAMAUS);
     IF RAMAUS THEN RAMTEK;
     WRITE('NAME DES BILDES (OHNE EXT.) : ');
     READLN(NAME1); WRITELN;
     INFILE:=NAME1+'.DAT';
     SUCH_THEMA(NAME1);   { HOLT THEMA (INCL DIR) UND BNAME (OHNE DIR) }
     BILDINFO_LESEN(THEMA);
     WRITELN; WRITELN;
     IF RAMAUS THEN BEGIN
        WRITE('KLASSIFIKATION MIT NACHFRAGE? ');
        READLN(SON);
     END;
{    WRITE('FAKTOR FUER BIN.SCHWELLE AVEM: ');
     READLN(BINFAK);   }  BINFAK:=1;
     BEW_MATRIZEN_LESEN;
     RECAUS:=TRUE;

WRITELN; WRITELN;
     OPEN(RECOUT,THEMA+'.OP6',NEW);
     REWRITE(RECOUT);
     WRITELN(RECOUT);
     WRITELN(RECOUT);
     WRITELN(RECOUT,NAME1);
     WRITELN(RECOUT);
     XOFFSET:=0;
     ZWZEIT:=CLOCK;
     BILDEINLESEN;
     IF RAMAUS THEN RMZOOM(2,2);
     GESZEIT:=CLOCK;
     IF NOT MOREINFO THEN BEGIN
        ZEILEN_SUMMENBILD;
        WORTZEILEN;
        ZEITAUSGABE('ZEIT FUER ZEILEN-SUMMENBILD/ WORTZEILEN-ERKENNUNG:',ZWZEIT);
     END;
     ZWZEIT:=CLOCK;
     EDGES(WORTMINZ,WORTMAXZ,2,SZAHL-1);
     ZEITAUSGABE('',ZWZEIT);
     ZWZEIT:=CLOCK;
```

```
    SPALTEN_SUMMENBILD;
    ZEITAUSGABE('',ZWZEIT);
    ZWZEIT:=CLOCK;
    SEG_ALLE;
    ZEITAUSGABE('ZEIT FUER EINZELZEICHEN-SEGM./ERKENNG.:',ZWZEIT);
    CLOSE(RECOUT);

WRITELN;
    ZEITAUSGABE('GESAMTE VERBRAUCHTE CPU-ZEIT:',GESZEIT);
{
    BIAUSLESEN;
}
END.

{ ============================================================

ENTHAELT GLOBALE VARIABLEN- UND FUNKTIONS-DEKLARATIONEN.

============================================================ }

CONST
    MAXSPALTE       = 512;
    MAXZEILE        = 512;
    BLLAENGE        = 512;
    MAXBLOCKBREITE  =  70;
    MAXBLOCKHOEHE   = 110;
    {----------------------------------------}
    KLSEG_MIN       = 0.92;
    GRSEG_MIN       = 0.96;
    {----------------------------------------}

TYPE
    BITTYP   = [BIT] 0..1;
    TNACHB   = ARRAY[0..7] OF INTEGER;
    TNAME    = VARYING[50] OF CHAR;

VAR
    {----------------------------------------}
    MINZIFFBREITE,    { MIN. ZIFFERNBREITE }
    MAXZIFFBREITE,    { MAX. ZIFFERNBREITE }
    ZIFFHOEHE1,       { NORMALE HOEHE DER ZIFFERN }
    ZIFFHOEHE2,       { ALTERNATIVE KLEINERE HOEHE DER ZIFFERN,
                        Z.B. DES STERNS }
    MAXSCHRIFTHOEHE   { MAX GESAMTHOEHE DES GGF. GEDREHTEN SCHRIFTBLOCKS }
                    : INTEGER;
    {----------------------------------------}

TYPE
    TZEILE   = ARRAY[0..MAXSPALTE+1] OF UBYTETYP;
    XYKOORD  = ARRAY[1..2] OF BYTETYP;

VAR
    DELTA             { DELTA-X, -Y IN DER MATRIX, DIE ZU EINEM CHAIN-CODE
                        GEHOEREN }
                    : ARRAY[0..7] OF XYKOORD;

VALUE
    DELTA[0]:= (1,0);
    DELTA[1]:= (1,-1);
    DELTA[2]:= (0,-1);
    DELTA[3]:= (-1,-1);
    DELTA[4]:= (-1,0);
    DELTA[5]:= (-1,1);
    DELTA[6]:= (0,1);
    DELTA[7]:= (1,1);

VAR
    R               { RICHTUNG DES GRADIENTEN }
                  : PACKED ARRAY[0..MAXZEILE+1] OF TZEILE;
    BILD,           { ORIGINALBILD }
    G               { GRADIENTENBILD }
                  : INT4MATRIX;
    ZGRADSUM        { PRO BILDZEILE DIE SUMME ALLER DIFF'S AUFEIN-
```

```
                              ANDERFOLGENDER BILDGRAUWERTE }
                      : ARRAY[1..MAXZEILE] OF INTEGER;
       RECAUS,SON,
       MOREINFO,
       RAMAUS         : BOOLEAN;
       ABGEHAKT       : PACKED ARRAY[1..512] OF BITTYP;
       RECOUT,
       BILDEIN        : TEXT;
       BLOCKBREITE,      { BREITE DES BLOCKS ZUR UEBERGABE AN KLASSIFIKATION }
       BLOCKHOEHE,       { HOEHE DES WORTBEREICHES FUER UEBERGABE AN KLASS.}
       Z,S,I,
       EBENE,
       LOWER_MEAN,
       UPPER_MEAN,
       NORM_MEAN,
       WORTMINZ,
       WORTMAXZ,
       YSHIFT,
       ANZSCHMALZ,
       X0,Y0,
       XOFFSET        : INTEGER;
       BINFAK         : REAL;
       THEMA          : TNAME;

FUNCTION IN_BOUNDS(S: INTEGER): BOOLEAN;
BEGIN
   IF (S<1) OR (S>512) THEN IN_BOUNDS:=FALSE ELSE IN_BOUNDS:=TRUE;
END;

PROCEDURE SUCH_THEMA(NAME: TNAME);
VAR    I,J : INTEGER;
       CH  : CHAR;
BEGIN
   THEMA:='';
   I:=0;
   REPEAT
     I:=I+1;
     CH:=NAME[I];
   UNTIL ((CH>='0') AND (CH<='9')) OR (I=LENGTH(NAME));
   IF (CH>='0') AND (CH<='9') THEN
     FOR J:=1 TO I-1 DO
         THEMA:=THEMA+NAME[J]
   ELSE
     THEMA:=NAME;
END;

END.

{ ==============================================================

ENTHAELT DIE PROZEDUREN ZUR SEGMENTIERUNG DER ZEICHEN IM BILD

============================================================== }

CONST
      RMTF       = 80;    { FAKTOR ZUR DARSTELLG. DES SPALTENSUMMENBILDES }
{     LOWERFK    = 1/4;
      NORMFK     = 1/2;   }
      LOWERFK    = 1/2;
      NORMFK     = 3/4;
      UPPERFK    = 1/1;   { EINZELZEICHENSEGM. }
      SMALLFK    = 3/2;   { FALLS SMALLFK*MEAN_SGRADSUM UEBERSCHRITTEN WURDE,
                            SOLL EIN SCHMALES SEGMENT AUCH DANN AKZEPTIERT
                            WERDEN, WENN ES DIE TRENNBED. NICHT ERFUELLT. }
      STRICHBR   = 10;    { LAENGE VON SPALTEN, UBER DIE DIE GRAD.WERTE
                            SUMMIERT WERDEN BEI DER EINZELZ.SEGM. }
      MINDBREITE = 15;    { MINDESTBREITE EINES ZEICHEN IM BILD, DAMIT
                            ES ALS SCHMALES ZEICHEN ZU ERKENNEN VERSUCHT WIRD }
      MINDRAND   = 3;     { MINDESTABSTAND DES SEGM. ZEICHENS VOM BILDRAND }
```

```
TYPE
      GRAD_WEIGHTS = ARRAY [0..3] OF TNACHB;

VAR
      GRADW               { DIE GEWICHTE DER NACHBAR-GRAUWERTE BEI DER
                            BERECHNUNG DES KOMPASS-GRAD. }
                          : GRAD_WEIGHTS;
      SGRADSUM              { PRO BILDSPALTE (IN DEN INTERESSANTEN BILDZEILEN)
                              DIE SUMME DER GRADIENTEN }
                          : ARRAY[1..MAXSPALTE] OF INTEGER;
      BEKANNT             : ARRAY[1..512] OF BITTYP;
      GESZEIT,
      J,ZW,
      WE,BESTRI,
      MAXGRAD,GLOBMAXGRAD,
      THRES_STEP,THRES,
      MAX_SGRADSUM,
      MEAN_SGRADSUM,
      ZZAHL,SZAHL         { ZEILEN-/SPALTENZAHL DES BILDES }
                          : INTEGER;
      INFILE
                          : TNAME;

{ FOLGENDE DEKLARATIONEN FUER BILDEIN-/AUSLESE-ROUTINEN }
TYPE
      ZEILE  = PACKED ARRAY[1..BLLAENGE] OF CHAR;
      TIHEAD = ARRAY[1..256] OF INTEGER;
VAR
    HILF : ZEILE;
    IHEAD : TIHEAD;

VALUE
   GRADW[0]:=(0,-1,-2,-1,0,1,2,1);
   GRADW[1]:=(1,0,-1,-2,-1,0,1,2);
   GRADW[2]:=(2,1,0,-1,-2,-1,0,1);
   GRADW[3]:=(1,2,1,0,-1,-2,-1,0);

PROCEDURE HEADCI(HILF : ZEILE; VAR IHEAD : TIHEAD; NDIM : INTEGER); EXTERN;
PROCEDURE HEADIC(IHEAD : TIHEAD; VAR HILF : ZEILE; NDIM : INTEGER); EXTERN;

PROCEDURE RAMTEK;
BEGIN
   RMINIT; RMLVLT; RMRSET;
END;

PROCEDURE BILDEINLESEN;
{ ORIGINAL-GRAUWERTBILD WIRD EINGELESEN }
BEGIN
     WRITELN('BILD WIRD VOM FILE GELESEN');
     OPEN(BILDEIN,INFILE,READONLY,BLLAENGE,SEQUENTIAL,FIXED,NOCARRIAGE);
     RESET(BILDEIN);
     READLN(BILDEIN,HILF);
     HEADCI(HILF,IHEAD,128);
     SZAHL := IHEAD[1];
     ZZAHL := IHEAD[2];
     MOREINFO := (IHEAD[3]=5);
     IF MOREINFO THEN BEGIN
        WORTMINZ:=IHEAD[4]+1;
        WORTMAXZ:=IHEAD[5]-1;
        WRITELN('INFO GELESEN: WORTMINZ/MAXZ=',WORTMINZ:5,WORTMAXZ:5);
        IF (WORTMAXZ-WORTMINZ+1)<ZIFFHOEHE1 THEN BEGIN
           ZIFFHOEHE1:=WORTMAXZ-WORTMINZ+1;
           WRITELN('ZIFFHOEHE1 VERKLEINERT AUF',ZIFFHOEHE1);
        END;
     END;
     FOR Z := 1 TO ZZAHL DO BEGIN
        READLN(BILDEIN,HILF);
        FOR S := 1 TO SZAHL DO
           BILD[Z,S] := ORD(HILF[S]);
     END;
     CLOSE(BILDEIN);
     IF RAMAUS THEN RMWRI(XOFFSET,0,514,514,BILD);
END;
```

```
PROCEDURE ZEILEN_SUMMENBILD;
{ SUMMIERT DIE ABS-DIFFERENZEN AUFEINANDERFOLGENDER GRAUWERTE FUER ALLE
  PUNKTE EINER ZEILE,
  SPEICHERT DIE WERTE IN ZGRADSUM[Z] }
VAR
  MAXZGRADSUM   : INTEGER;
BEGIN
  WRITELN('ZEILEN-GRADIENTEN-SUMMENBILD');
  MAXZGRADSUM:=0;
  FOR Z:=1 TO ZZAHL DO
    BEGIN
      ZGRADSUM[Z]:= ABS(BILD[Z,1]-BILD[Z,2]);
      FOR S:=2 TO SZAHL DO
        BEGIN
          ZGRADSUM[Z]:=ZGRADSUM[Z]+ABS(BILD[Z,S]-BILD[Z,S-1]);
        END;
      IF MAXZGRADSUM<ZGRADSUM[Z] THEN MAXZGRADSUM:=ZGRADSUM[Z];
    END; { FOR Z }
  IF RAMAUS THEN
    FOR Z:=1 TO ZZAHL DO
      RMERS(513,Z,MAX2(1,ZGRADSUM[Z]*50 DIV MAXZGRADSUM),1,255);
END;

PROCEDURE WORTZEILEN;
{ SUCHT/BELEGT DIE WERTE WORTMINZ, WORTMAXZ,
  ZWISCHEN DENEN DIE GESUCHTEN ZEICHEN LIEGEN.
  VERWENDET ZGRADSUM[Z], D.H. DAS ERGEBNIS VON ZEILEN_SUMMENBILD.
  JEWEILS ZIFFHOEHE SUMMENBILD-WERTE WERDEN AUFSUMMIERT UND
  VON DIESEN ZGRADSUM_SUM'S DER MAXIMALE GESUCHT.
  DANN WERDEN (MAXSCHRIFTHOEHE-ZIFFHOEHE1)/2 ZEILEN OBEN UND UNTEN
  HINZUGEFUEGT. }
VAR
  HALBHOEDIFF, MAXSUM, ZGRADSUM_SUM: INTEGER;
BEGIN
  MAXSUM:=-1;
  ZGRADSUM_SUM:=ZGRADSUM[1];
  FOR Z:=1 TO ZIFFHOEHE1-1 DO
    ZGRADSUM_SUM:=ZGRADSUM_SUM+ZGRADSUM[Z];
  Z:=ZIFFHOEHE1;
  REPEAT
    { EINE NEUE SUMME WIRD GEBILDET: DER EINTRAG FUER DIE AELTESTE ZEILE
      WIRD GELOESCHT, EINE NEUE ZEILE WIRD EINGETRAGEN }
    ZGRADSUM_SUM:=ZGRADSUM_SUM+ZGRADSUM[Z];
    IF ZGRADSUM_SUM>MAXSUM THEN BEGIN
      MAXSUM:=ZGRADSUM_SUM; WORTMAXZ:=Z;
    END;
    Z:=Z+1;
    ZGRADSUM_SUM:=ZGRADSUM_SUM-ZGRADSUM[Z-ZIFFHOEHE1];
  UNTIL Z=ZZAHL;
  HALBHOEDIFF:=(MAXSCHRIFTHOEHE-ZIFFHOEHE1) DIV 2;
  WORTMAXZ:= WORTMAXZ+HALBHOEDIFF;
  WORTMINZ:= WORTMAXZ-MAXSCHRIFTHOEHE+1;
  WRITELN('WORTMINZ=',WORTMINZ:5,'   WORTMAXZ=',WORTMAXZ:5);
  IF RAMAUS THEN
    BEGIN
      RMERS(XOFFSET+1,WORTMINZ-1,512,1,255);
      RMERS(XOFFSET+1,WORTMAXZ+1,512,1,255);
    END;
END;

PROCEDURE EDGES(OB,UN,LI,RE: INTEGER);
{ GRADIENTENBILD ERSTELLEN }
VAR  GM,GRAD: INTEGER;
BEGIN
  WRITELN;
  WRITELN('KOMPASS-GRADIENTENBILD WIRD ERSTELLT');
  { WRITELN('OB,UN,LI,RE=',OB:4,UN:4,LI:4,RE:4); }
  GLOBMAXGRAD:=0;
  FOR Z:=OB TO UN DO
    BEGIN
      G[Z,1]:=0;
      FOR S:=LI TO RE DO
```

```
      BEGIN
        MAXGRAD:=-1;
        FOR WE:=0 TO 3 DO
          BEGIN
            GRAD:=0;
            FOR I:=0 TO 7 DO BEGIN
              GRAD:=(GRAD+GRADW[WE,I]*BILD[Z+DELTA[I,2],S+DELTA[I,1]]);
            END;
            IF ABS(GRAD)>MAXGRAD THEN BEGIN
              MAXGRAD:=ABS(GRAD);
              BESTRI:=WE;
              { IF GRAD>0 THEN BESTRI:=WE ELSE BESTRI:=WE+4; }
            END;
          END; { FOR WE }
        G[Z,S]:=MAXGRAD;
        R[Z,S]:=BESTRI;
        IF MAXGRAD>GLOBMAXGRAD THEN GLOBMAXGRAD:=MAXGRAD;
      END; { FOR S }
    G[Z,SZAHL]:=0;
  END;
{ WRITELN(' GLOBMAXGRAD=',GLOBMAXGRAD:5);  }

{  FOR Z:=OB+1 TO UN-1 DO
    FOR S:=LI+1 TO RE-1 DO BEGIN
      ZW:=ROUND(255*G[Z,S]/GLOBMAXGRAD);
      CASE R[Z,S] OF
        0: G[Z,S]:= CONV1(0,ZW,0);
        1: G[Z,S]:= CONV1(ZW,ZW,0);
        2: G[Z,S]:= CONV1(ZW,0,0);
        3: G[Z,S]:= CONV1(0,ZW,ZW);
      END;
    END;
  RMWRI(XOFFSET,0,514,514,G);
}
END;

PROCEDURE SPALTEN_SUMMENBILD;
{ IN WORTMINZ BIS WORTMAXZ WIRD PRO SPALTE DAS MAXIMUM UEBER DIE SUMME VON
  STRICHBR GRADIENTEN GESUCHT UND IN SGRADSUM[S] ABGELEGT. }
VAR   L1, L2, IT    : INTEGER;
      CH: CHAR;
BEGIN
  WRITELN('SPALTEN-SUMMENBILD DES GRADIENTEN');
  FOR S:=1 TO SZAHL DO
    SGRADSUM[S]:=0;
  FOR S:=2 TO SZAHL-1 DO BEGIN
    ZW:=0;
    FOR Z:=WORTMINZ TO WORTMINZ+STRICHBR-1 DO
      ZW:=ZW+G[Z,S];
    SGRADSUM[S]:=ZW;
    FOR Z:=WORTMINZ+STRICHBR TO WORTMAXZ DO
      BEGIN
        ZW:=ZW-G[Z-STRICHBR,S]+G[Z,S];
        IF ZW>SGRADSUM[S] THEN SGRADSUM[S]:=ZW;
      END;
  END;
  SGRADSUM[1]:=0;
  SGRADSUM[SZAHL]:=0;

{ IF RAMAUS THEN RMWRI(XOFFSET,514,514,514,G);  }

{ 3* GLAETTUNG DES SUMMENBILDES }
  FOR IT:=1 TO 3 DO
    BEGIN
      L2:= (SGRADSUM[1] + SGRADSUM[2]) DIV 2;
      FOR S:=2 TO SZAHL-1 DO
        BEGIN
          L1:=L2;
          L2:= (SGRADSUM[S-1] + SGRADSUM[S] + SGRADSUM[S+1]) DIV 3;
          SGRADSUM[S-1]:=L1;
```

```
        END;
      SGRADSUM[SZAHL]:= (SGRADSUM[SZAHL-1] + SGRADSUM[SZAHL]) DIV 2;
      SGRADSUM[SZAHL-1]:=L2;
    END;

{ MAXIMUM UND MITTELWERT DER SGRADSUM'S BERECHNEN }
    MAX_SGRADSUM:=0;
    MEAN_SGRADSUM:=0;
    FOR S:=1 TO SZAHL DO BEGIN
      MEAN_SGRADSUM:=MEAN_SGRADSUM+SGRADSUM[S];
      IF MAX_SGRADSUM<SGRADSUM[S] THEN MAX_SGRADSUM:=SGRADSUM[S];
    END;
    MEAN_SGRADSUM:= MEAN_SGRADSUM DIV SZAHL;
{   WRITELN('MAX/MEAN_SGRADSUM=',MAX_SGRADSUM:9,MEAN_SGRADSUM:9); }

IF RAMAUS THEN BEGIN
      RMERS(XOFFSET+1,WORTMAXZ+3,SZAHL,MAX_SGRADSUM*RMTF DIV MAX_SGRADSUM+2,
         180);
      FOR S:=1 TO SZAHL DO
        RMERS(XOFFSET+S,WORTMAXZ+3,1,SGRADSUM[S]*RMTF DIV MAX_SGRADSUM,0);
    END;
    IF RAMAUS THEN BEGIN
      RMERS(XOFFSET+1,
        WORTMAXZ+3+(ROUND(MEAN_SGRADSUM*LOWERFK*RMTF) DIV MAX_SGRADSUM),512,1,80);
      RMERS(XOFFSET+1,
        WORTMAXZ+3+(ROUND(MEAN_SGRADSUM*NORMFK*RMTF) DIV MAX_SGRADSUM),512,1,80);
      RMERS(XOFFSET+1,
        WORTMAXZ+3+(ROUND(MEAN_SGRADSUM*UPPERFK*RMTF) DIV MAX_SGRADSUM),512,1,80);
    END;

LOWER_MEAN:=ROUND(MEAN_SGRADSUM*LOWERFK);
    NORM_MEAN:=ROUND(MEAN_SGRADSUM*NORMFK);
    UPPER_MEAN:=ROUND(MEAN_SGRADSUM*UPPERFK);

END;

PROCEDURE FEINHOEHE(XA,XE: INTEGER; VAR Y1: INTEGER);
{ BERECHNET ZU DEM ZEICHEN IN WORTMINZ..WORTMAXZ, XA+1..XE-1 DIE
  EXAKTE LAGE BZGL ZIFFHOEHE1/2.
  BELEGT Y1 (STARTZEILE DES BLOCKS MIT DEM ZEICHEN BEI ZIFFHOEHE1) }
VAR
  ZW, ZEICHMAXZ, MAXSUM, ZGRADSUM_SUM: INTEGER;
BEGIN
  FOR Z:=WORTMINZ TO WORTMAXZ DO BEGIN
    ZGRADSUM[Z]:=0;
    S:=XA;
    REPEAT
      S:=S+1;
      ZGRADSUM[Z]:=ZGRADSUM[Z]+G[Z,S];
    UNTIL S=XE-1;
{    WRITELN('Z/ZGRADSUM=',Z:4,ZGRADSUM[Z]:9);    }
  END;

{ SEGM BZGL ZIFFHOEHE1 }
  MAXSUM:=-1;
  ZGRADSUM_SUM:=0;
  FOR Z:=WORTMINZ TO WORTMINZ+ZIFFHOEHE1-2 DO
    ZGRADSUM_SUM:=ZGRADSUM_SUM+ZGRADSUM[Z];
  Z:=WORTMINZ+ZIFFHOEHE1-1;
  REPEAT
    { EINE NEUE SUMME WIRD GEBILDET: DER EINTRAG FUER DIE AELTESTE ZEILE
      WIRD GELOESCHT, EINE NEUE ZEILE WIRD EINGETRAGEN }
    ZGRADSUM_SUM:=ZGRADSUM_SUM+ZGRADSUM[Z];
    IF ZGRADSUM_SUM>MAXSUM THEN BEGIN
      MAXSUM:=ZGRADSUM_SUM; ZEICHMAXZ:=Z;
    END;
    Z:=Z+1;
    ZGRADSUM_SUM:=ZGRADSUM_SUM-ZGRADSUM[Z-ZIFFHOEHE1];
  UNTIL Z>WORTMAXZ;
  Y1:= ZEICHMAXZ - (ZIFFHOEHE1-1);
  IF RAMAUS THEN BEGIN
    RMERS(XOFFSET+XA+1,Y1,ABS(XE-XA)-1,1,255);
    RMERS(XOFFSET+XA+1,Y1+ZIFFHOEHE1-1,ABS(XE-XA)-1,1,255);
  END;
END;
```

```
FUNCTION IN_BEREICH(X: INTEGER): BOOLEAN;
BEGIN
   IF (X>=1) AND (X<=512) THEN IN_BEREICH:=TRUE ELSE IN_BEREICH:=FALSE;
END;

FUNCTION ZULAESSIG(X: INTEGER): BOOLEAN;
BEGIN
   IF (X<MINDRAND) OR (X>SZAHL-MINDRAND) THEN ZULAESSIG:=FALSE
   ELSE ZULAESSIG:=TRUE;
END;

PROCEDURE GET_INTERV_START(STARTS: INTEGER;
                           VAR XAS: INTEGER;
                           LAUFRI: INTEGER;
                           VAR GEF: BOOLEAN;
                           THRES: INTEGER);
{ SUCHE NACH EINEM SGRADSUM[XAS]-WERT, DER >= THRES IST.
  SUCHE AB STARTS IN LAUFRI +1/-1, FALLS GEF(UNDEN), DANN
  IST XAS DER GEFUNDENE PUNKT }
BEGIN
   GEF:=FALSE;
   XAS:=STARTS+LAUFRI;
   IF IN_BEREICH(XAS) THEN
   REPEAT
     IF SGRADSUM[XAS]>=THRES THEN
         BEGIN GEF:=TRUE; XAS:=XAS-LAUFRI END
       ELSE
         XAS:=XAS+LAUFRI;
   UNTIL GEF OR NOT(IN_BEREICH(XAS));
END;

PROCEDURE GET_INTERV_END(STARTS: INTEGER;
                         VAR XES: INTEGER;
                         LAUFRI: INTEGER;
                         VAR GEF: BOOLEAN;
                         THRES: INTEGER);
{ SUCHE NACH EINEM SGRADSUM[XAS]-WERT, DER < THRES IST.
  SUCHE AB STARTS IN LAUFRI +1/-1, FALLS GEF(UNDEN), DANN
  IST XAS DER GEFUNDENE PUNKT }
BEGIN
   GEF:=FALSE;
   XES:=STARTS+LAUFRI;
   IF IN_BEREICH(XES) THEN
   REPEAT
     IF SGRADSUM[XES]<THRES THEN
         GEF:=TRUE
       ELSE
         XES:=XES+LAUFRI;
   UNTIL GEF OR NOT(IN_BEREICH(XES));
END;

FUNCTION OK_BREITE(L,R: INTEGER): BOOLEAN;
BEGIN
   IF (ABS(L-R)-1>=MINZIFFBREITE) AND (ABS(L-R)-1<=MAXZIFFBREITE) THEN
     OK_BREITE:=TRUE
   ELSE
     OK_BREITE:=FALSE;
END;

PROCEDURE ERKENNE_ZEICHEN(XA,XE: INTEGER);
{ XA,XE= LETZTE PUNKTE AUSSERHALB DES ZEICHENBEREICHES !!! }
VAR   Y1,Y2: INTEGER;
      GRERGZCH,KLERGZCH: STRING10;
      BLACKSVERH,GRQUALITAET,KLQUALITAET: REAL;
      GRRUECKW,KLRUECKW: BOOLEAN;
BEGIN
    BLOCKBREITE:=ABS(XE-XA)-1;
    X0:=XA+1;
    FEINHOEHE(XA,XE,Y1);
```

```
   Y0:=Y1;
   WRITELN('ZEICHEN GEFUNDEN: X0/Y0/BREITE/HOEHE=',
     X0:5,Y0:5,ABS(XE-XA)-1:9,BLOCKHOEHE:5);
   RAMAUS := FALSE;
   Y0:=Y0-1; X0:=X0-1;
   BINARISIERUNG;
   Y0:=Y0+1; X0:=X0+1;
   BLACKSVERH:=0; KLQUALITAET:=0; KLRUECKW:=TRUE;
   IF ZIFFHOEHE2>0 THEN
      SMALLCHAR(BLACKSVERH,Y2);

IF BLACKSVERH<=GRSEG_MIN THEN BEGIN
       YSHIFT:=0;
       KLASSIFIKATION(GRERGZCH,GRQUALITAET,GRRUECKW);
   END;

IF BLACKSVERH>=GRSEG_MIN THEN BEGIN
       GRRUECKW:=TRUE;
       Y0:=Y0+Y2;
       BLOCKHOEHE:=ZIFFHOEHE2;
       WRITELN('KLASS. DES KLEINEREN SEGMENTS AB Y0=',Y0:6,
          '  HOEHE=',BLOCKHOEHE:5);
       IF RAMAUS THEN BEGIN
          RMRGB(255,255,255,XOFFSET+X0,Y0,BLOCKBREITE,1);
          RMRGB(255,255,255,XOFFSET+X0,Y0+BLOCKHOEHE-1,BLOCKBREITE,1);
       END;
       YSHIFT:=Y2;
       KLASSIFIKATION(KLERGZCH,KLQUALITAET,KLRUECKW);
       IF KLRUECKW THEN GRERGZCH:=KLERGZCH;
   END;

IF NOT KLRUECKW THEN
       IF (KLQUALITAET>GRQUALITAET) OR GRRUECKW THEN BEGIN
          GRERGZCH:=KLERGZCH; GRQUALITAET:=KLQUALITAET; GRRUECKW:=FALSE;
       END;
   WRITELN('ERGEBNIS= ',GRERGZCH:1,'  QUALITAET:',GRQUALITAET:8:2);
   IF GRRUECKW AND KLRUECKW THEN
      WRITELN('+++ VORLAGE ZURUECKGEWIESEN +++');
   RAMAUS:=TRUE;
   IF RAMAUS THEN BEGIN
      IF NOT GRRUECKW THEN
         RMTEXT(255,255,255,XOFFSET+X0,WORTMINZ-30,3,1,GRERGZCH)
      ELSE
         RMTEXT(255,0,0,XOFFSET+X0,WORTMINZ-30,3,1,GRERGZCH);
   END;
   WRITELN;

{      RAMAUS := TRUE;  }

END;

FUNCTION SEARCHMAX(X1,X2: INTEGER): INTEGER;
VAR   M : INTEGER;
BEGIN
  M:=0;
  FOR S:=MIN2(X1,X2) TO MAX2(X1,X2) DO
    IF SGRADSUM[S]>M THEN M:=SGRADSUM[S];
  SEARCHMAX:=M;
END;

PROCEDURE EIN_ZEICHEN(XAS,XES,LAUFRI: INTEGER;
                      VAR GEF: BOOLEAN;
                      VAR XA,XE: INTEGER);
{ EINZELZEICHEN-SEGMENTIERUNG:
  GEGEBEN IST EIN INTERVALL ZWISCHEN XA,XE, IN DENEN SGRADSUM >= NORM_MEAN
  IST.
  GESUCHT IST EINE VERSCHIEBUNG DER SCHWELLE DERART, DASS DAS
  INTERVALL ERLAUBTE BREITE HAT (FALLS ES DAS ZU BEGINN NICHT HAT) }
VAR
   LOK_THRES,
   THRES_STEP,
```

```
   XAA,XEA,
   AB               : INTEGER;
BEGIN
{ WRITELN('EINZELZEICHEN-SEGMENTIERUNG XAS/XES:',XAS:5,XES:5,LAUFRI:5); }
   THRES_STEP:= NORM_MEAN DIV 50;
   LOK_THRES:=NORM_MEAN;
   WRITELN('LOK_THRES=',LOK_THRES:7);
   XA:=XAS; XE:=XES;
   GEF:=TRUE;

IF ABS(XA-XE)-1>MAXZIFFBREITE THEN BEGIN
      REPEAT
         LOK_THRES:=LOK_THRES+THRES_STEP;
         WRITELN('LOK_THRES=',LOK_THRES:7);
         IF LOK_THRES>UPPER_MEAN THEN GEF:=FALSE
         ELSE BEGIN
            AB:=XA;
            GET_INTERV_START(AB,XA,LAUFRI,GEF,LOK_THRES);
            IF GEF THEN
               GET_INTERV_END(XA,XE,LAUFRI,GEF,LOK_THRES);
         END;
      UNTIL (ABS(XA-XE)-1<=MAXZIFFBREITE) OR NOT(GEF);
      IF GEF THEN IF NOT(OK_BREITE(XA,XE)) THEN GEF:=FALSE;
   END
   ELSE
   IF ABS(XA-XE)-1<MINZIFFBREITE THEN BEGIN
      REPEAT
         LOK_THRES:=LOK_THRES-THRES_STEP;
         WRITELN('LOK_THRES=',LOK_THRES:7);
         IF LOK_THRES<LOWER_MEAN THEN GEF:=FALSE
         ELSE BEGIN
            XAA:=XA; XEA:=XE;
            AB:=XA+LAUFRI;
            GET_INTERV_END(AB,XA,-LAUFRI,GEF,LOK_THRES);
            IF GEF THEN BEGIN
               AB:=XE-LAUFRI;
               GET_INTERV_END(AB,XE,LAUFRI,GEF,LOK_THRES);
            END;
         END;
      UNTIL (ABS(XA-XE)-1>=MINZIFFBREITE) OR NOT(GEF);
      ZW:=(ABS(XA-XE)-1);
      IF ZW>MAXZIFFBREITE THEN BEGIN
         XA:=XAA; XE:=XEA; LOK_THRES:=LOK_THRES+THRES_STEP;
         IF (ANZSCHMALZ>0) AND (SEARCHMAX(XA,XE)>=SMALLFK*MEAN_SGRADSUM) AND
         (ABS(XA-XE)-1>=MINDBREITE) THEN
            GEF:=TRUE
         ELSE
            GEF:=FALSE;
      END
      ELSE
         IF (ANZSCHMALZ>0) AND (ZW<MINZIFFBREITE) AND
         (ZW>=MINDBREITE) THEN BEGIN
            LOK_THRES:=LOK_THRES+THRES_STEP;
            GEF:=TRUE;
         END;
   END;

IF GEF THEN
      IF (NOT ZULAESSIG(XA)) OR (NOT ZULAESSIG(XE)) THEN
         GEF:=FALSE;

IF GEF THEN BEGIN
      S:=XA;
      REPEAT
         S:=S+LAUFRI;
      UNTIL (BEKANNT[S]=1) OR (S=XE-LAUFRI);
      IF BEKANNT[S]=1 THEN GEF:=FALSE;
   END;

IF NOT GEF THEN
      WRITELN('NIX TO HOLN')
   ELSE
```

```
    BEGIN
        WRITELN('GEFUNDEN: XA/XE=',XA:5,XE:5);
        FOR S:= XA+1 TO XE-1 DO BEKANNT[S]:=1;
        BLOCKBREITE:=ABS(XA-XE)-1;
        BLOCKHOEHE:=ZIFFHOEHE1;
        WRITELN;
        IF RAMAUS THEN BEGIN
           RMERS(XOFFSET+MIN2(XA+LAUFRI,XE-LAUFRI),
             WORTMAXZ+3+(LOK_THRES*RMTF DIV MAX_SGRADSUM),ABS(XE-XA)-1,1,255);
           RMERS(XOFFSET+XA+LAUFRI,WORTMINZ,1,WORTMAXZ-WORTMINZ+1,255);
           RMERS(XOFFSET+XE-LAUFRI,WORTMINZ,1,WORTMAXZ-WORTMINZ+1,255);
        END;
     END;
END;

PROCEDURE SEG_ALLE;
VAR
   XA,XE,X1,X2,
   XAS,XES         : INTEGER;
   AKZ,
   GEF             : BOOLEAN;
BEGIN
   FOR S:=1 TO 512 DO BEKANNT[S]:=0;
   GEF:=FALSE;
   XES:=MINDRAND;
   XAS:=XES;
   AKZ:=TRUE;

REPEAT
       GET_INTERV_START(XES,XAS,1,GEF,NORM_MEAN);
       IF GEF THEN BEGIN
          GET_INTERV_END(XAS,XES,1,GEF,NORM_MEAN);
          WRITELN('INTERV: START/END=',XAS:5,XES:5);
          EIN_ZEICHEN(XAS,XES,1,AKZ,XA,XE);
          IF AKZ THEN BEGIN
             ERKENNE_ZEICHEN(XA,XE);
             IF ABS(XES-XE)>MINZIFFBREITE THEN BEGIN
                X1:=XES; X2:=XE;
                WRITELN('RUECKW-SUCHE: START/END=',X1:5,X2:5);
                EIN_ZEICHEN(X1,X2,-1,AKZ,XA,XE);
                IF AKZ THEN BEGIN
                   ZW:=XA; XA:=XE; XE:=ZW;
                   ERKENNE_ZEICHEN(XA,XE);
                END;
             END;
          END;
       END;
       XES:=MAX2(XES,XE);
   UNTIL NOT GEF;

END;

END.

{ ================================================================

ENTHAELT DIE VORVERARBEITUNG UND KLASSIFIKATION DER ZEICHEN

================================================================ }

CONST
   {-----------------------------------------------}
   RUECKW_SCHWELLE1       = 3.5;   {7.5}
   LIMIT_FOR_CANDIDATES   = 10;        { FUER BINARISIERUNG }
   MINDDIST               = 2;
   {-----------------------------------------------}

MAX_NZ   = 40;      { MAX. ZEILEN DER REFERENZMUSTER }
      MAX_NS   = 24;      { MAX. SPALTEN ---------- }
      MAX_K    = 36;      { MAX. ANZ. GELERNTE ZEICHEN }
```

```
TYPE
     TSTANDARDMATR        = ARRAY[1..MAX_NZ,1..MAX_NS] OF DOPPELBYTE;
     TIDEALE              = ARRAY[1..MAX_K] OF TSTANDARDMATR;
     TBEWMATR             = ARRAY[0..3] OF TSTANDARDMATR;
     TRICHTUNGSMATR       = ARRAY[1..MAX_NZ,1..MAX_NS] OF UBYTETYP;
     TVORLAGEBINAER       = ARRAY[1..MAXBLOCKHOEHE,1..MAXBLOCKBREITE] OF BITTYP;

VAR
     LMFILE       { ENTHAELT DIE BEW-MATRIZEN }
                      : FILE OF TSTANDARDMATR;
     INFO         { INFO-DATEI }
                      : TEXT;
     DISFILE      { ENTHAELT DIE DURCHSCHN. DIFF JE ZWEIER BEW-MATR *100 }
                      : FILE OF INTEGER;
     MUNAME       { NAME DES SATZES DER GELERNTER MUSTER }
                      : FILENAME;
     ABZUG,
     MOEGL            : ARRAY[1..MAX_K] OF INTEGER;
     TEXTFILE         : TEXT;
     BEW          { BEWERTUNGSMATRIZEN }
                      : ARRAY[1..MAX_K] OF TBEWMATR;
     R_VOR        { KANTENRICHTUNG IN DER VORLAGE DURCH GRADIENTEN-OPERATOR }
                      : TRICHTUNGSMATR;
     DIS          { SIEHE DISFILE }
                      : ARRAY[1..MAX_K,1..MAX_K] OF INTEGER;
     ERG,         { DIFFERENZ REALER ABSTAND - MINIMAL NOTWENDIGER ABST
                    ZWEIER VGL-WERTE }
     VGL          { VERGLEICHS-ERGEBNISSE IN DER VORAUSWAHL }
                      : ARRAY[1..MAX_K] OF REAL;
     KLASSENCHAR  { SCHRIFTZEICHEN ZUR LAUFENDEN NUMMER DES EINTRAGS IN
                    DER INFO-DATEI }
                      : ARRAY[1..MAX_K] OF CHAR;
     VORLAGE      { BINARISIERTES GRAD.BILD }
                      : TVORLAGEBINAER;

K,           { ANZAHL GELERNTER ZEICHEN }
     NS,NZ,       { SPALTEN/ ZEILEN DER IDEALMUSTER }

AV,          { ANZAHL DER VORDERGRUNDPUNKTE IM BINARISIERTEN GRAD.BILD }
     KLASSE,      { LAUFENDE NR. EINES ZEICHENS GEMAESS INFO-DATEI }
     BESTKLASSE,  { BESTES ZEICHEN VON DEN GELERNTEN }
     SECBESTK,    { ZWEITBESTES }
     RICH,
     RI           { KANTENRICHTUNGEN }
                      : INTEGER;
     MAXVGL,      { MAX. VGL-WERT IN DER VORAUSWAHL }
     XFAKTOR,
     YFAKTOR      { VERZERRUNGSFAKTOREN BEI VERKLEINERUNG/VERGROESSERUNG }
                      : REAL;
     RICHTOUT     { RAMTEK-AUSGABE DER KANTENRICHTUNGEN DER VORLAGE? }
                      : BOOLEAN;
     SCHMALZ          : ARRAY[1..MAX_K] OF BOOLEAN;

FUNCTION RMIN2(A,B: REAL): REAL;
BEGIN
   IF B<A THEN RMIN2:=B ELSE RMIN2:=A;
END;

PROCEDURE INFO_LESEN;
{ LESEN DER INFO-DATEI ZUM MUSTERSATZ }
VAR  KL1,KL2: INTEGER;
     CHA : CHAR;
BEGIN
     WRITELN;
     OPEN(INFO,'SEQ:'+MUNAME+'.INFO',READONLY);
     RESET(INFO);
     READLN(INFO,NS,NZ);      { REFERENZ-BREITE, -HOEHE }
     READLN(INFO,K);          { K = ANZAHL GELERNTER ZEICHEN }
     IF K>MAX_K THEN BEGIN
        K:=MAX_K;
        WRITELN('*** ANZ. KLASSEN IST GROESSER ALS ERLAUBT !! ***');
```

```
     END;
     WRITE('MUSTERSATZ:    ');
     FOR I:=1 TO K DO
       BEGIN
         READ(INFO,KLASSENCHAR[I]);
         WRITE(KLASSENCHAR[I]:1);
       END;
     READLN(INFO);
     WRITELN;
     WRITE('ZEICHEN SCHMALER ALS MIN: ');
     IF NOT EOF(INFO) THEN BEGIN
       READLN(INFO,ANZSCHMALZ);
       FOR I:=1 TO ANZSCHMALZ DO BEGIN
         READ(INFO,KL1);
         SCHMALZ[KL1]:=TRUE;
         WRITE(KLASSENCHAR[KL1]:1);
       END;
     END;
     WRITELN; WRITELN;
     CLOSE(INFO);

OPEN(DISFILE,'SEQ:'+MUNAME+'.DIS',READONLY,ERROR:=CONTINUE);
     IF STATUS(DISFILE)=0 THEN BEGIN
       WRITELN('READING DIS-FILE.');
       RESET(DISFILE);
       FOR KL1:=1 TO K-1 DO
         FOR KL2:=KL1+1 TO K DO BEGIN
           READ(DISFILE,DIS[KL1,KL2]);
           DIS[KL1,KL2]:=DIS[KL1,KL2]*MINDDIST;
           DIS[KL2,KL1]:=DIS[KL1,KL2];
         END;
       CLOSE(DISFILE);
     END
     ELSE
       BEGIN
         WRITELN('NO DIS-FILE.');
         FOR KL1:=1 TO K-1 DO
           FOR KL2:=KL1+1 TO K DO BEGIN
             DIS[KL1,KL2]:=0;
             DIS[KL2,KL1]:=0;
           END;
       END;

OPEN(TEXTFILE,'SEQ:'+MUNAME+'.ABZ',READONLY);
     RESET(TEXTFILE);
     FOR KL1:=1 TO K DO READLN(TEXTFILE,ABZUG[KL1]);
     CLOSE(TEXTFILE);
     OPEN(TEXTFILE,'SEQ:'+MUNAME+'.MOE',READONLY);
     RESET(TEXTFILE);
     FOR KL1:=1 TO K DO READLN(TEXTFILE,CHA,MOEGL[KL1]);
     CLOSE(TEXTFILE);

FOR KL1:=1 TO K DO BEGIN
       MOEGL[KL1]:=MOEGL[KL1]-NZ*NS*ABZUG[KL1];
     END;
END;

PROCEDURE BILDINFO_LESEN(THEMA: TNAME);
{ LESEN DER INFO-DATEI ZUM BILD }
BEGIN
     WRITELN;
     OPEN(INFO,THEMA+'.INFO',READONLY);
     RESET(INFO);
     READLN(INFO,MAXSCHRIFTHOEHE);
     READLN(INFO,MINZIFFBREITE,MAXZIFFBREITE);
     READLN(INFO,ZIFFHOEHE1,ZIFFHOEHE2);
     WRITELN('MAXSCHRIFTHOEHE  =',MAXSCHRIFTHOEHE:6);
     WRITELN('ZIFFHOEHE1/2     =',ZIFFHOEHE1:6,ZIFFHOEHE2:6);
     WRITELN('MIN/MAXZIFFBREITE=',MINZIFFBREITE:6,MAXZIFFBREITE:6);
     CLOSE(INFO);
END;
```

```
PROCEDURE BEW_MATRIZEN_LESEN;
{ DAS LM-FILE ENTHAELT DIE BEWERTUNGSMATRIZEN FUER JE EIN ZEICHEN }
BEGIN
  WRITE('NAME DES MUSTERSATZES: (OHNE DIR.&EXT.) ');
  READLN(MUNAME); WRITELN;
  INFO_LESEN;
  WRITELN('RUECKW_SCHWELLE FUER QUALITAET: ',RUECKW_SCHWELLE1:8:2);
  WRITELN('BEWERTUNGSMATRIZEN WERDEN EINGELESEN');
  FOR KLASSE:=1 TO K DO BEGIN
    OPEN(LMFILE,'SEQ:'+MUNAME+'.LM'+STRI(KLASSE),OLD);
    RESET(LMFILE);
    FOR RI:=0 TO 3 DO
      READ(LMFILE,BEW[KLASSE,RI]);
    CLOSE(LMFILE);
  END;
END;
{ **** BINARISIERUNG DURCH CANDIDATES/ SUPERIORS }

PROCEDURE BINARISIERUNG;
VAR
  AVEMSUM,    { SUMME DER GRAD.STAERKEN DER CANDIDATES }
  AVEM,       { MITTL. GRAD.STAERKE DER CANDIDATES }
  CBC,        { ANZ. CANDIDATES }
  RZW,ZW,     { ZWISCHENSPEICHER }
  ORT1,ORT2   { CHAIN-CODE-RICHTUNGEN ORTHOGONAL ZUR KANTENRICHTUNG }
              : INTEGER;
BEGIN
{ WRITELN('X0/Y0/BLBR/BLHO=',X0:4,Y0:4,BLOCKBREITE:4,BLOCKHOEHE:4);}
  { BERECHNUNG DER CANDIDATES }
  AVEMSUM:=0; CBC:=0;
  FOR Z:=1 TO BLOCKHOEHE DO
    FOR S:=1 TO BLOCKBREITE DO  { SCAN DURCH DIE VORLAGE }
      BEGIN
        VORLAGE[Z,S]:=0;
        IF G[Y0+Z,X0+S]>LIMIT_FOR_CANDIDATES THEN
          BEGIN
            RZW:=R[Y0+Z,X0+S];
            ORT1:= (RZW+2) MOD 8;
            ORT2:= (RZW+6) MOD 8;
            ZW:=G[Y0+Z,X0+S];
            IF ( ZW>=G[Y0+Z+DELTA[ORT1,2],X0+S+DELTA[ORT1,1]] ) AND
               ( ZW>=G[Y0+Z+DELTA[ORT2,2],X0+S+DELTA[ORT2,1]] ) THEN
              BEGIN
                VORLAGE[Z,S]:=1;
                CBC:=CBC+1;
                AVEMSUM:=AVEMSUM+ZW;
              END;
          END;
      END;
  AVEM:=ROUND(BINFAK*AVEMSUM/CBC);

{ BERECHNUNG DER SUPERIORS (CANDIDATES MIT GRAD.STAERKE >= AVEM) }
  IF RAMAUS THEN RMERS(X0+1+XOFFSET,Y0+1,BLOCKBREITE,BLOCKHOEHE,0);
  FOR Z:=1 TO BLOCKHOEHE DO
    FOR S:=1 TO BLOCKBREITE DO
      BEGIN
        IF VORLAGE[Z,S]=1 THEN
          BEGIN
            IF G[Y0+Z,X0+S]>=AVEM THEN
              BEGIN
                IF RAMAUS THEN BEGIN
                  RZW:= R[Y0+Z,X0+S];
                  CASE RZW OF
                    0: RMT(0,255,0,XOFFSET+X0+S,Y0+Z,FALSE,1);
                    1: RMT(255,255,0,XOFFSET+X0+S,Y0+Z,FALSE,2);
                    2: RMT(255,0,0,XOFFSET+X0+S,Y0+Z,FALSE,3);
                    3: RMT(0,255,255,XOFFSET+X0+S,Y0+Z,FALSE,4);
                  END;
                END
              END
            ELSE
              BEGIN
                VORLAGE[Z,S]:=0;
              END
          END;
      END;
```

```
   IF RAMAUS THEN BEGIN
      RMT(0,255,0,1,1,TRUE,1);
      RMT(255,255,0,1,1,TRUE,2);
      RMT(255,0,0,1,1,TRUE,3);
      RMT(0,255,255,1,1,TRUE,4);
   END;
END;

PROCEDURE SMALLCHAR(VAR BLACKSVERH: REAL; VAR Y2: INTEGER);
VAR  ZEICHMAXZ,ZW,ZGRADSUM_SUM,MAXSUM,ANZBLACKS: INTEGER;
BEGIN
   ANZBLACKS:=0;
   FOR Z:=1 TO BLOCKHOEHE DO BEGIN
      ZW:=0;
      FOR S:=1 TO BLOCKBREITE DO
         IF VORLAGE[Z,S]>0 THEN BEGIN
            ZW:=ZW+1; ANZBLACKS:=ANZBLACKS+1;
         END;
      ZGRADSUM[Z]:=ZW;
   END;

{ SUMME VORDERGRDPUNKTE FUER ZIFFHOEHE2 }
   MAXSUM:=-1;
   ZGRADSUM_SUM:=0;
   FOR Z:=1 TO ZIFFHOEHE2-2 DO
      ZGRADSUM_SUM:=ZGRADSUM_SUM+ZGRADSUM[Z];
   Z:=ZIFFHOEHE2;
   REPEAT
      { EINE NEUE SUMME WIRD GEBILDET: DER EINTRAG FUER DIE AELTESTE ZEILE
        WIRD GELOESCHT, EINE NEUE ZEILE WIRD EINGETRAGEN }
      ZGRADSUM_SUM:=ZGRADSUM_SUM+ZGRADSUM[Z];
      IF ZGRADSUM_SUM>MAXSUM THEN BEGIN
         MAXSUM:=ZGRADSUM_SUM; ZEICHMAXZ:=Z;
      END;
      Z:=Z+1;
      ZGRADSUM_SUM:=ZGRADSUM_SUM-ZGRADSUM[Z-ZIFFHOEHE2];
   UNTIL Z>ZIFFHOEHE1;
   BLACKSVERH:=MAXSUM/ANZBLACKS;
   WRITELN('ANZBLACKS IM KL/GR SEGMENT:',ANZBLACKS:7,MAXSUM:7,
   ' VERH KL/GR=',BLACKSVERH:8:2);
   Y2:=ZEICHMAXZ - (ZIFFHOEHE2-1);
END;

PROCEDURE CLEAR_BLOCK;
{ RAMTEK-RECHTECKE LOESCHEN }
BEGIN
      IF RAMAUS THEN BEGIN
         IF RICHTOUT THEN BEGIN
            RMERS(X0+XOFFSET-1,0,NS+2,4*NZ+5,255);
            RMERS(X0+XOFFSET,1,NS,NZ,0);
            RMERS(X0+XOFFSET,NZ+2,NS,NZ,0);
            RMERS(X0+XOFFSET,2*NZ+3,NS,NZ,0);
            RMERS(X0+XOFFSET,3*NZ+4,NS,NZ,0);
         END
         ELSE
            RMERS(X0+XOFFSET,0,NS,NZ,0);
      END;
END;

PROCEDURE SHOW_RICHT;
{ NUR FUER RAMTEK-AUSGABE }
BEGIN
               IF RAMAUS THEN BEGIN
                  IF RICHTOUT THEN
                     RMT(255,255,255,XOFFSET+X0+S-1,Z+RICH*(NZ+1),FALSE,1)
                  ELSE
                     CASE RICH OF
                        0: RMT(0,255,0,XOFFSET+X0+S-1,Z-1,FALSE,1);
                        1: RMT(255,255,0,XOFFSET+X0+S-1,Z-1,FALSE,2);
                        2: RMT(255,0,0,XOFFSET+X0+S-1,Z-1,FALSE,3);
                        3: RMT(0,255,255,XOFFSET+X0+S-1,Z-1,FALSE,4);
                     END;
               END;
```

```
END;

PROCEDURE RICHT_RAUS;
{ NUR FUER RAMTEK-AUSGABE }
BEGIN
  IF RAMAUS THEN BEGIN
    IF RICHTOUT THEN
      RMT(255,255,255,0,0,TRUE,1)
    ELSE BEGIN
      RMT(0,255,0,0,0,TRUE,1);
      RMT(255,255,0,0,0,TRUE,2);
      RMT(255,0,0,0,0,TRUE,3);
      RMT(0,255,255,0,0,TRUE,4);
    END;
  END;
END;

PROCEDURE DIF_MATR(KL1,KL2: INTEGER);
VAR  BEWSUM1,BEWSUM2,DIFSUM,MA,ZW : INTEGER;
BEGIN
  MA:=0;
  FOR RI:=0 TO 3 DO
    FOR Z:=1 TO NZ DO
      FOR S:=1 TO NS DO BEGIN
        ZW:=ABS(BEW[KL1,RI,Z,S]-BEW[KL2,RI,Z,S]);
        IF ZW>MA THEN MA:=ZW;
      END;
  RMERS(0,50,4*(NS+3)+5,50+NZ+5,80);
  FOR RI:=0 TO 3 DO BEGIN
    DIFSUM:=0; BEWSUM1:=0; BEWSUM2:=0;
    FOR Z:=1 TO NZ DO
      FOR S:=1 TO NS DO BEGIN
        BEWSUM1:=BEWSUM1+BEW[KL1,RI,Z,S];
        BEWSUM2:=BEWSUM2+BEW[KL2,RI,Z,S];
        ZW:=(BEW[KL1,RI,Z,S]-BEW[KL2,RI,Z,S]);
        DIFSUM:=DIFSUM+ZW;
        IF ZW>0 THEN
          RMRGB(ROUND(255*ABS(ZW)/MA),0,0,S+RI*(NS+3),50+Z,1,1)
        ELSE
          RMRGB(0,ROUND(255*ABS(ZW)/MA),0,S+RI*(NS+3),50+Z,1,1);
        IF R_VOR[Z,S]=RI THEN BEGIN
          IF ZW>0 THEN
            RMRGB(ROUND(255*ABS(ZW)/MA),0,0,S+RI*(NS+3),100+Z,1,1)
          ELSE
            RMRGB(0,ROUND(255*ABS(ZW)/MA),0,S+RI*(NS+3),100+Z,1,1)
        END;
      END;
    WRITELN('DIFSUM KL1-KL2 DER BEW BEI RI',RI:2,' IST',DIFSUM:7);
    WRITELN(' BEWSUM KL1/KL2:',BEWSUM1:9,BEWSUM2:9);
  END;
END;

PROCEDURE FORMATANPASSUNG;
{ ANPASSUNG DES BINARISIERTEN GRAD.BILDES AN REFERENZ-FORMAT }
VAR    X,Y,
       XDIFF,YDIFF    : REAL;
       GRD,XD,YD,XK,YK   : INTEGER;
       MAXGRD
                       : TSTANDARDMATR;
BEGIN
     CLEAR_BLOCK;
     FOR Z:=1 TO NZ DO
       FOR S:=1 TO NS DO
         MAXGRD[Z,S]:=0;

FOR YD:=0 TO BLOCKHOEHE-1 DO    { SCAN DURCH VORLAGE }
       FOR XD:=0 TO BLOCKBREITE-1 DO
         IF VORLAGE[YD+YSHIFT+1,XD+1]=1 THEN BEGIN
           Y:=YFAKTOR*YD;
           X:=XFAKTOR*XD;
           XK:=TRUNC(X)+1; YK:=TRUNC(Y)+1;
           GRD:=G[Y0+YD,X0+XD];
```

```
              IF MAXGRD[YK,XK]<GRD THEN BEGIN
                R_VOR[YK,XK]:=R[Y0+YD,X0+XD];
                MAXGRD[YK,XK]:=GRD;
              END;
            END;

FOR Z:=1 TO NZ DO
        FOR S:=1 TO NS DO BEGIN
          IF MAXGRD[Z,S]=0 THEN R_VOR[Z,S]:=255  { HINTERGRUNDPUNKT }
          ELSE BEGIN
            AV:=AV+1;  { ANZAHL VORDERGRUNDPUNKTE IM BINAR. GRAD.BILD }
            RICH:=R_VOR[Z,S];
            SHOW_RICHT;
          END
        END;
      RICHT_RAUS;
{     WRITELN('ANZ. VORLAGEPUNKTE=',AV:6);  }
END;

PROCEDURE VERGLEICH(KLASSE: INTEGER);
{ VERGLEICH DES ZEICHENS KLASSE MIT DER VORLAGE.
  ERGEBNIS IST VGL[KLASSE] }
VAR
  POSBEWSUM,NEGBEWSUM,RZW,
  BEWSUM       : REAL;
  ZD,SD,RI     : INTEGER;
BEGIN
  BEWSUM:=0; POSBEWSUM:=0; NEGBEWSUM:=0;
  FOR Z:=1 TO NZ DO
    FOR S:=1 TO NS DO
      IF R_VOR[Z,S]<>255 THEN BEGIN
        RZW:=BEW[KLASSE,R_VOR[Z,S],Z,S]/10;
        BEWSUM:=BEWSUM+RZW;
        IF RZW>0 THEN
          POSBEWSUM:=POSBEWSUM+RZW
        ELSE
          NEGBEWSUM:=NEGBEWSUM+RZW;
      END;

VGL[KLASSE]:=BEWSUM;
{  WRITELN(KLASSENCHAR[KLASSE]:1,' VGL/POS/NEG=',ROUND(BEWSUM):7,
   ROUND(POSBEWSUM):9,ROUND(NEGBEWSUM):7,' VERH=',POSBEWSUM/NEGBEWSUM:7:1);}
  IF VGL[KLASSE]>MAXVGL THEN BEGIN
    MAXVGL:=VGL[KLASSE];
    BESTKLASSE:=KLASSE;
  END;
END;

FUNCTION ERGDIFF(KL: INTEGER): REAL;
{ ERGEBNIS VON KL IM VERGLEICH ZU MAXVGL }
BEGIN
  ERGDIFF:= 100*ABS(VGL[KL]-MAXVGL)/(ABS(VGL[KL])+ABS(MAXVGL));
END;

PROCEDURE SECBEST;
VAR   VGLSECBEST: REAL;
      KL: INTEGER;
BEGIN
  VGLSECBEST:=-1000;
  FOR KL:=1 TO K DO
    IF (KL<>BESTKLASSE) AND (VGL[KL]>VGLSECBEST) THEN BEGIN
      SECBESTK:=KL; VGLSECBEST:=VGL[KL];
    END;
END;

PROCEDURE KLASSIFIKATION(VAR UEBERGABESTRING: STRING10; VAR QUALITAET: REAL;
  VAR RUECKW: BOOLEAN);
{ KLASSIF. DES SEGMENTES AB LI.OB. ECKE X0/Y0 MIT
  BLOCKBREITE/BLOCKHOEHE IN BILD }
VAR
  KL1,KL2: INTEGER;
```

```
BEGIN
{ WRITE('ZERLEGUNG DER VORLAGE AUF RMT? '); READLN(RICHTOUT); WRITELN;}
  RICHTOUT:=FALSE;
  AV:=0;
  MAXVGL:=-1;
  RUECKW:=FALSE;

YFAKTOR:= NZ/BLOCKHOEHE;
  IF BLOCKBREITE>=MINZIFFBREITE THEN
    XFAKTOR:= NS/BLOCKBREITE
  ELSE BEGIN
    WRITELN('FORMATANPASSUNG AUF SCHMALE ZEICHEN');
    XFAKTOR:= RMIN2(YFAKTOR,NS/BLOCKBREITE);
  END;
  FORMATANPASSUNG;
  FOR KLASSE:=1 TO K DO
    VERGLEICH(KLASSE);

KLASSE:=BESTKLASSE;
  WRITELN(' BEST= ',KLASSENCHAR[KLASSE]:1);
  IF RECAUS THEN
   WRITELN(RECOUT,' BEST= ',KLASSENCHAR[KLASSE]:1);
  UEBERGABESTRING[1]:=KLASSENCHAR[BESTKLASSE];
  WRITELN('ERR/MOEGL/VERH=',VGL[BESTKLASSE]:9:1,MOEGL[BESTKLASSE]:9,
   VGL[BESTKLASSE]/MOEGL[BESTKLASSE]:8:5);
   SECBEST;
   WRITELN(' SECBEST=',KLASSENCHAR[SECBESTK]:2,'    ABST=',
     ERGDIFF(SECBESTK):6:1,'   GEFORDERTER ABST=',
     DIS[BESTKLASSE,SECBESTK]/100:6:1);
   IF RECAUS THEN
    WRITELN(RECOUT,' SECBEST=',KLASSENCHAR[SECBESTK]:2,'    ABST=',
     ERGDIFF(SECBESTK):6:1,'   GEFORDERTER ABST=',
     DIS[BESTKLASSE,SECBESTK]/100:6:1);

WRITELN(VGL[BESTKLASSE]:9,VGL[SECBESTK]:9);
  FOR KLASSE:=1 TO K DO
    IF KLASSE<>BESTKLASSE THEN
      ERG[KLASSE]:=ERGDIFF(KLASSE)-DIS[BESTKLASSE,KLASSE]/100;
  KLASSE:=1;
  REPEAT
    IF KLASSE<>BESTKLASSE THEN
      IF ERG[KLASSE]<0 THEN BEGIN
        RUECKW:=TRUE;
        WRITELN('*** RUECKW: GEFORDERTE DISTANZ NICHT ERREICHT');
        WRITELN('*** ZU ',KLASSENCHAR[KLASSE]:1,' VGLS: ',
          MAXVGL:7:1,VGL[KLASSE]:7:1,
          ' => ABST=',ERGDIFF(KLASSE):6:1,
          '  GEFORDERTER ABST=',DIS[BESTKLASSE,KLASSE]/100:6:1);
        IF RECAUS THEN
         WRITELN(RECOUT,'*** RUECKW: GEFORDERTE DISTANZ NICHT ERREICHT');
        IF RECAUS THEN
          WRITELN(RECOUT,'*** ',KLASSENCHAR[KLASSE]:1,' VGLS: ',
            MAXVGL:7:1,VGL[KLASSE]:7:1,
            ' => ABST=',ERGDIFF(KLASSE):6:1,
            '  GEFORDERTER ABST=',DIS[BESTKLASSE,KLASSE]/100:6:1);
      END;
    KLASSE:=KLASSE+1;
  UNTIL (KLASSE>K) OR (RUECKW);

IF MAXVGL/AV<RUECKW_SCHWELLE1 THEN BEGIN
    RUECKW:=TRUE;
    WRITELN('***RUECKWEISUNG: VGL/VORLAGEPUNKTE=',
      MAXVGL/AV:6:2,' < ',
      RUECKW_SCHWELLE1:5:1);
    IF RECAUS THEN
      WRITELN(RECOUT,'***RUECKWEISUNG: VGL/VORLAGEPUNKTE=',
        MAXVGL/AV:6:2,' < ',
        RUECKW_SCHWELLE1:5:1);
  END;

QUALITAET:=VGL[BESTKLASSE]/AV;
  IF RECAUS THEN WRITELN(RECOUT,'    / QUALITAET=',QUALITAET:6:2);
  IF RECAUS THEN WRITELN(RECOUT);
```

```
  IF RAMAUS AND SON THEN
    REPEAT
      WRITE('DIF-MATR ZU KL1 KL2: (0 0 = ENDE) ');
      READLN(KL1,KL2);
      IF KL1<>KL2 THEN DIF_MATR(KL1,KL2);
    UNTIL KL1=KL2;

END;

END.

{ ==========================================================

PROGRAMM ZUM ERZEUGEN DER BEWERTUNGSMATRIZEN AUS-
  DEN REFERENZZEICHEN, DENEN BEREITS-KANTENRICHTUNGEN ZUGEORDNET WURDEN.

========================================================== }

CONST
    MAX_INZ   = 90;        { MAX. ANZ. ZEILEN DES TRAIN.MUSTERS }
    MAX_INS   = 50;        {              SPALTEN               }
    MAX_NZ    = 40;        { MAX. ANZ. ZEILEN DER BEW.MATR }
    MAX_NS    = 24;        {              SPALTEN          }
    MAX_K     = 36;        { MAX. ANZ. OUTPUT-KLASSEN }
    MAXBLOCKBREITE = 70;   { FUER DAS IM ORIGINALBILD SEGMENTIERTE RECHTECK }
    MAXBLOCKHOEHE  = 100;  { --"-- }
    BLLAENGE       = 512;
    {-------------------------}
    B1        = 4;         { FUER VERTEILUNG DER BELOHNUNGEN }
    B2        = 3;
    B3        = 1;
    {-------------------------}

TYPE
    TIDEALMATR  = ARRAY[1..MAX_INZ,1..MAX_INS] OF DOPPELBYTE;
    TIDEAL      = ARRAY[1..MAX_K] OF TIDEALMATR;
    TLM         = ARRAY[0..3] OF TIDEALMATR;
    TLIMA       = ARRAY[1..MAX_K] OF TLM;
    TBEWMATR    = ARRAY[1..MAX_NZ,1..MAX_NS] OF DOPPELBYTE;
    TDREIERBEL  = ARRAY[1..8] OF INTEGER;
    FILENAME    = VARYING[50] OF CHAR;
    EINMUSTER   = ARRAY[1..MAX_INZ,1..MAX_INS] OF INTEGER;

VAR
    BELOHNUNG       : ARRAY[0..3] OF TDREIERBEL;
    LMFILE          : FILE OF TBEWMATR;
    INFO,
    ABZUGFILE       : TEXT;
    ABZUG           : ARRAY[1..MAX_K] OF DOPPELBYTE;
    LIMA            : TLIMA;
    OUTLIMA         : TBEWMATR;
    BEWERT          : TLM;
    MUGELESEN       : ARRAY[1..MAX_K] OF BOOLEAN;
    ALLE,
    RAMAUS,
    LMAUCH          : BOOLEAN;
    MUNAME             { NAME DES SATZES ALLER ZU LERN. MUSTER }
                    : FILENAME;
    CH              : CHAR;
    MUSTER      { ORIGINALBILDER TRAININGSMUSTER }
                    : ARRAY[1..MAX_K] OF EINMUSTER;
    IFELD           : ARRAY[1..2,0..3] OF EINMUSTER;
    OUTFILNAM,  { EXTERNER NAME EINES GEWICHTSFILES }
    INFILNAM    { EXTERNER NAME VON BILDEIN }
                    : FILENAME;
    KLASSENCHAR     : ARRAY[1..MAX_K] OF CHAR;
    IDEAL           : TIDEAL;
    WISHNR,
    VORGRI,
    BEW_B,BEW_H,
    BLSIZ,
    RI,ZW,
    K,                      { ANZ. KLASSEN }
```

```
      NS,NZ,
      I,Z,S,
      KLASSE,              { LAEUFT DURCH DIE KLASSEN-NUMMERN }
      KL1,KL2,
      ZOOMF,
      VERGL_KLASSE,
      LAUF_KLASSE
                   : INTEGER;
      DISTANZWERT50,DISTANZWERT24,
      DISTANZWERT : ARRAY[0..MAX_NS] OF INTEGER;

VALUE
   BELOHNUNG[0]:= (B1,B2,B3,0,0,0,B3,B2);
   BELOHNUNG[1]:= (B3,B2,B1,B2,B3,0,0,0);
   BELOHNUNG[2]:= (0,0,B3,B2,B1,B2,B3,0);
   BELOHNUNG[3]:= (B3,0,0,0,B3,B2,B1,B2);
   DISTANZWERT50 := (3,3,3,2,2,1,0,0,0,0,0,0,0,0,0,0,0,0,0,0,0,0,0,0,0);
   DISTANZWERT24 := (3,2,2,1,1,0,0,0,0,0,0,0,0,0,0,0,0,0,0,0,0,0,0,0,0);

PROCEDURE VERTEILGSFKT;
BEGIN
   IF NS=50 THEN BEGIN
      DISTANZWERT:=DISTANZWERT50;
      BLSIZ := 5;
   END;
   IF NS=24 THEN BEGIN
      DISTANZWERT:=DISTANZWERT24;
      BLSIZ := 4;
   END;
END;

[EXTERNAL] PROCEDURE RMWRI(X0,Y0,NX,NY: INTEGER; IFELD: EINMUSTER); EXTERN;

FUNCTION STRI(I: INTEGER): FILENAME;
BEGIN
   IF I<10 THEN STRI:=CHR(48+I)
     ELSE
      STRI:=CHR(48+ I DIV 10) + CHR(48+ I MOD 10);
END;

FUNCTION RMAX2(A,B: REAL): REAL;
BEGIN
   IF B>A THEN RMAX2:=B ELSE RMAX2:=A;
END;

FUNCTION RMIN2(A,B: REAL): REAL;
BEGIN
   IF B<A THEN RMIN2:=B ELSE RMIN2:=A;
END;

PROCEDURE INFO_LESEN;
BEGIN
     WRITELN;
     OPEN(INFO,MUNAME+'.INFO',READONLY);
     RESET(INFO);
     READ(INFO,BEW_B,BEW_H);
     IF EOLN(INFO) THEN BEGIN
        NS:=BEW_B; NZ:=BEW_H;
        READLN(INFO);
     END
     ELSE
        READLN(INFO,NS,NZ);
     WRITELN('REF.ZEICHEN-FORMAT =',NS:5,NZ:4);
     WRITELN('BEW.MATR.-FORMAT   =',BEW_B:5,BEW_H:4);
     VERTEILGSFKT;
     READLN(INFO,K);
     WRITE('MUSTERSATZ: ');
     FOR I:=1 TO K DO
        BEGIN
           READ(INFO,KLASSENCHAR[I]);
           WRITE(KLASSENCHAR[I]:1);
        END;
     WRITELN;
     CLOSE(INFO);
```

```
    OPEN(ABZUGFILE,MUNAME+'.ABZ',OLD,ERROR:=CONTINUE);
    IF STATUS(ABZUGFILE)=0 THEN BEGIN
      WRITELN('READING ABZ-FILE.');
      RESET(ABZUGFILE);
      FOR I:=1 TO K DO
        READLN(ABZUGFILE,ABZUG[I]);
      CLOSE(ABZUGFILE);
    END
    ELSE BEGIN
      WRITELN('ABZ-FILE WAS EMPTY.');
      FOR I:=1 TO K DO
        ABZUG[I]:=0;
    END;
END;

PROCEDURE MUSTEREINLESEN(NR: INTEGER);
TYPE
     ZEILE = PACKED ARRAY[1..BLLAENGE] OF CHAR;
VAR
    HILF : ZEILE;
    BILDEIN : TEXT;
    INFILE  : VARYING[50] OF CHAR;
    KLASSE,XSHIFT,RIC,MINS,MAXS: INTEGER;

BEGIN
  IF NR=0 THEN KLASSE:=1 ELSE KLASSE:=NR;

IF NOT MUGELESEN[KLASSE] THEN
  REPEAT

INFILE:=MUNAME+'.'+STRI(KLASSE)+'1';
    OPEN(BILDEIN,INFILE,READONLY,512,SEQUENTIAL,FIXED,NOCARRIAGE);
    RESET(BILDEIN);
    READLN(BILDEIN,HILF);

MINS:=NS; MAXS:=0;
    FOR Z := 1 TO NZ DO
    BEGIN
         READLN(BILDEIN,HILF);
         FOR S := 1 TO NS  DO
         BEGIN
             RIC := ORD(HILF[S]) DIV 30;
             IDEAL[KLASSE,Z,S] := RIC;
             IF RIC>0 THEN BEGIN
             IF S>MAXS THEN MAXS:=S;
             IF S<MINS THEN MINS:=S;
             END;
         END;
    END;
    CLOSE(BILDEIN);

XSHIFT:= ((NS-MAXS)-(MINS-1)) DIV 2;
    IF NR=0 THEN
       WRITELN('KLASSE',KLASSE:3);

MUGELESEN[KLASSE]:=TRUE;
    IF NR=0 THEN KLASSE:=KLASSE+1;

UNTIL (NR<>0) OR ( KLASSE>K);

END;

FUNCTION IN_BLOCK(O1,O2: INTEGER): BOOLEAN;
BEGIN
   IF (O1>0) AND (O2>0) THEN IN_BLOCK:=TRUE ELSE IN_BLOCK:=FALSE;
END;

PROCEDURE BEW_VERKL(KLASSE: INTEGER);
VAR
   SF,ZF  : REAL;
   X,Y    : INTEGER;
```

```
BEGIN
  WRITELN('FORMAT-TRANSFORMATION');
  SF:=NS/BEW_B;
  ZF:=NZ/BEW_H;
  FOR I:=0 TO 3 DO
    FOR Z:=1 TO BEW_H DO
      FOR S:=1 TO BEW_B DO BEGIN
        X:= TRUNC((S-1)*SF)+1;
        Y:= TRUNC((Z-1)*ZF)+1;
        BEWERT[I,Z,S]:=LIMA[KLASSE,I,Y,X]
      END;
  FOR I:=0 TO 3 DO
    LIMA[KLASSE,I]:=BEWERT[I];
END;

PROCEDURE BELOHNUNGEN;
{ VERTEILUNG DER BELOHNUNGEN BZGL KLASSE }
VAR
  BELMEAN              : REAL;
  SUM,MAXLINELIMA,IZW,
  ZD,SD                : INTEGER;
BEGIN
  FOR RI:=0 TO 3 DO
    FOR Z:=1 TO NZ DO
      FOR S:=1 TO NS DO
        LIMA[KLASSE,RI,Z,S]:=0;
  FOR Z:=1 TO NZ DO  { KOORD IM IDEAL }
    FOR S:=1 TO NS DO
      IF IDEAL[KLASSE,Z,S]>0 THEN BEGIN
        VORGRI:=IDEAL[KLASSE,Z,S];
        { KOORD IN BELOHNUNGSMATRIX LM : }
        FOR ZD:=-MIN2(BLSIZ,Z-1) TO MIN2(BLSIZ,NZ-Z) DO
          FOR SD:=-MIN2(BLSIZ,S-1) TO MIN2(BLSIZ,NS-S) DO
            FOR RI:=0 TO 3 DO BEGIN
              IZW:=LIMA[KLASSE,RI,Z+ZD,S+SD]+
                10*BELOHNUNG[RI,VORGRI]*DISTANZWERT[MAX2(ABS(ZD),ABS(SD))];
              IF ABS(IZW)>32767 THEN
                WRITELN('*** OVERFLOW IN LIMA ***');
              LIMA[KLASSE,RI,Z+ZD,S+SD]:=IZW;
            END; { FOR ZD/SD/RI }
      END; { IF IDEAL }

MAXLINELIMA:=0;
  FOR SD:=-BLSIZ TO BLSIZ DO
    MAXLINELIMA:=MAXLINELIMA+10*B1*DISTANZWERT[ABS(SD)];
{ WRITELN('MAXLINELIMA*10=',MAXLINELIMA:8);   }

FOR Z:=1 TO NZ DO
    FOR S:=1 TO NS DO
      FOR RI:=0 TO 3 DO
        LIMA[KLASSE,RI,Z,S]:= MIN2(LIMA[KLASSE,RI,Z,S],MAXLINELIMA);

IF (BEW_B<>NS) OR (BEW_H<>NZ) THEN
    BEW_VERKL(KLASSE);

SUM:=0;
  FOR Z:=1 TO BEW_H DO
    FOR S:=1 TO BEW_B DO
      FOR RI:=0 TO 3 DO
        SUM:=SUM+LIMA[KLASSE,RI,Z,S];
  BELMEAN:= SUM/(BEW_B*BEW_H*4);
  ABZUG[KLASSE]:=ROUND(BELMEAN);
  WRITELN('ABZUG BEI NORMIERUNG:',ROUND(BELMEAN):8);

FOR Z:=1 TO BEW_H DO
    FOR S:=1 TO BEW_B DO
      FOR RI:=0 TO 3 DO BEGIN
        ZW:=ROUND((LIMA[KLASSE,RI,Z,S]-BELMEAN));
        IF (ZW<-32768) OR (ZW>32767) THEN
          WRITELN('*** ERROR: OVERFLOW DES ERWARTUNGSWERTES*10')
        ELSE
          LIMA[KLASSE,RI,Z,S]:=ZW;
      END;
END;
```

```
PROCEDURE LMFILE_SCHREIBEN(KLASSE: INTEGER);
BEGIN
  OPEN(LMFILE,MUNAME+'.LM'+STRI(KLASSE),NEW);
  REWRITE(LMFILE);
  FOR RI:=0 TO 3 DO BEGIN
    FOR Z:=1 TO BEW_H DO
      FOR S:=1 TO BEW_B DO
        OUTLIMA[Z,S]:=LIMA[KLASSE,RI,Z,S];
    WRITE(LMFILE,OUTLIMA);
  END;
  CLOSE(LMFILE);
END;

PROCEDURE ABZ_FILE_SCHREIBEN;
BEGIN
  OPEN(ABZUGFILE,MUNAME+'.ABZ',NEW);
  REWRITE(ABZUGFILE);
  FOR I:=1 TO K DO
    WRITELN(ABZUGFILE,ABZUG[I]:8);
  CLOSE(ABZUGFILE);
END;

PROCEDURE LM_ZEIGEN(KLASSE,NS,NZ: INTEGER);
VAR
  ZW,MAXI: INTEGER;
BEGIN
  IF RAMAUS THEN BEGIN
    MAXI:=0;
    FOR RI:=0 TO 3 DO
      FOR Z:=1 TO NZ DO
        FOR S:=1 TO NS DO
          IF ABS(LIMA[KLASSE,RI,Z,S])>MAXI THEN MAXI:=ABS(LIMA[KLASSE,RI,Z,S]);
    FOR RI:=0 TO 3 DO BEGIN
      FOR Z:=1 TO NZ DO BEGIN
        FOR S:=1 TO NS DO BEGIN
          ZW:= ROUND(LIMA[KLASSE,RI,Z,S]*255/MAXI);
          IF ZW>=0 THEN
            BEGIN IFELD[1,RI,Z,S]:=ZW; IFELD[2,RI,Z,S]:=0 END
          ELSE
            BEGIN IFELD[1,RI,Z,S]:=0; IFELD[2,RI,Z,S]:=ABS(ZW) END;
        END;
        IF MAX_INS>NS THEN
          FOR S:=NS+1 TO MAX_INS DO
            BEGIN IFELD[1,RI,Z,S]:=100; IFELD[2,RI,Z,S]:=100 END;
      END;
      RMWRI((NS+3)*RI+3,3,MAX_INS,NZ,IFELD[1,RI]);
      RMWRI((NS+3)*RI+3,NZ+3,MAX_INS,NZ,IFELD[2,RI]);
    END;
  END;
END;

PROCEDURE ALLE_RAUS;
VAR
  XOFF,YOFF: INTEGER;
BEGIN
  RMZOOM(2,2);
  XOFF:=0; YOFF:=0;

FOR KLASSE:=1 TO K DO BEGIN

RMERS(XOFF,YOFF,NS+2,1,255);
      RMERS(XOFF,YOFF,1,NZ+2,255);
      RMERS(XOFF,YOFF+NZ+1,NS+2,1,255);
      RMERS(XOFF+NS+1,YOFF,1,NZ+2,255);
      FOR Z := 1 TO NZ DO
        FOR S := 1 TO NS  DO
          IF IDEAL[KLASSE,Z,S]>0 THEN
            RMT(255,255,255,XOFF+S,YOFF+Z,FALSE,1);

XOFF:=XOFF+NS+1;
      IF XOFF+NS>512 THEN
        BEGIN XOFF:=0; YOFF:=YOFF+NZ+1; END;
```

```
      END;
   RMT(255,255,255,0,0,TRUE,1);
END;
{
PROCEDURE LMLESEN(KLASSE: INTEGER);
BEGIN
      OPEN(LMFILE,MUNAME+'.LM'+STRI(KLASSE),OLD);
      RESET(LMFILE);
      FOR RI:=0 TO 3 DO
         READ(LMFILE,LIMA[KLASSE,RI]);
      CLOSE(LMFILE);
END;
}

PROCEDURE SBEW_ZEIGEN(KL1,KL2: INTEGER);
VAR
   SBEW                { DIE SBEW-MATRIZEN }
                         : ARRAY[1..2,0..3] OF TBEWMATR;
   MAXBEL,             { ABS. MAX. MATRIX-WERT ZUR RAMTEK-DARSTELLUNG }
   RZW,                { ZWISCHENSPEICHER }
   ABZUG1,ABZUG2,      { MITTELWERTE DER SBEW-MATRIZEN }
   SVERGL1,SVERGL2     { DIE SVERGL-WERTE }
                         : REAL;
   S1,S2,              { ZUM TEST AUF OVERFLOW BEI NEUEN SBEW-WERTEN }
   SBEWSUM1,SBEWSUM2,  { DIE SUMMEN DER SBEW-MATRIZEN ZUR NORMRIERUNG }
   I,J,RI              : INTEGER;

BEGIN
    { SBEW-MATRIZEN BERECHNEN }
    SBEWSUM1:=0;
    SBEWSUM2:=0;
    FOR Z:=1 TO NZ DO
      FOR S:=1 TO NS DO
        FOR I:=0 TO 3 DO BEGIN
           RZW:=ABS((LIMA[KL1,I,Z,S]+ABZUG[KL1])-(LIMA[KL2,I,Z,S]+ABZUG[KL2]));
           S1:=ROUND(RZW*(LIMA[KL1,I,Z,S]+ABZUG[KL1])/100);
           S2:=ROUND(RZW*(LIMA[KL2,I,Z,S]+ABZUG[KL2])/100);
           IF ABS(S1)>32767 THEN
              WRITELN('*** ERROR: OVERFLOW S1');
           IF ABS(S2)>32767 THEN
              WRITELN('*** ERROR: OVERFLOW S2');
           SBEW[1,I,Z,S]:=S1;
           SBEW[2,I,Z,S]:=S2;
           SBEWSUM1:=SBEWSUM1+S1;
           SBEWSUM2:=SBEWSUM2+S2;
        END;
   ABZUG1:=SBEWSUM1/(NS*NZ*4);
   ABZUG2:=SBEWSUM2/(NS*NZ*4);

MAXBEL:=0;
      FOR Z:=1 TO NZ DO   { KOORD IM IDEAL }
        FOR S:=1 TO NS DO
          FOR I:=0 TO 3 DO BEGIN
              IF ABS(SBEW[1,I,Z,S]-ABZUG1)>MAXBEL THEN MAXBEL:=
                ABS(SBEW[1,I,Z,S]-ABZUG1);
              IF ABS(SBEW[2,I,Z,S]-ABZUG2)>MAXBEL THEN MAXBEL:=
                ABS(SBEW[2,I,Z,S]-ABZUG2);
          END;
      RMERS(0,0,512,512,100);
      FOR RI:=0 TO 3 DO
      FOR Z:=1 TO NZ DO  { KOORD IM IDEAL }
        FOR S:=1 TO NS DO
          BEGIN
              RZW:= 255*(SBEW[1,RI,Z,S]-ABZUG1)/MAXBEL;
              IF RZW<0 THEN
                RMERS(RI*(NS+1)+S,NZ+1+Z,1,1,ABS(ROUND(RZW)))
              ELSE
                RMERS(RI*(NS+1)+S,Z,1,1,ABS(ROUND(RZW)));
              RZW:= 255*(SBEW[2,RI,Z,S]-ABZUG2)/MAXBEL;
              IF RZW<0 THEN
                RMERS(RI*(NS+1)+S,3*(NZ+1)+5+Z,1,1,ABS(ROUND(RZW)))
```

```
              ELSE
                 RMERS(RI*(NS+1)+S,2*(NZ+1)+5+Z,1,1,ABS(ROUND(RZW)));
          END;
END;

BEGIN {*******************************************************}
  WRITE('AUSGABE AUF RAMTEK (T/F) ? ');
  READLN(RAMAUS);
  IF RAMAUS THEN BEGIN
     RMINIT; RMRSET; RMLVLT;
  END;
  WRITE('NAME DES MUSTERSATZES: (OHNE EXT.) ');
  READLN(MUNAME);
  INFO_LESEN;
  FOR KLASSE:=1 TO K DO MUGELESEN[KLASSE]:=FALSE;
  ALLE:=FALSE;
  IF RAMAUS THEN BEGIN
     WRITELN;
     WRITE('DARSTELLUNG ALLER ZEICHEN AUF RAMTEK? (T/F) ');
     READLN(ALLE);
     IF ALLE THEN BEGIN
        WRITELN('IDEALMUSTER WERDEN EINGELESEN');
        MUSTEREINLESEN(0);
        ALLE_RAUS;
     END;
  END;
  WRITELN;
  WRITE('BEARBEITUNG VON KLASSE NR. (0=ALLE): ');
  READLN(WISHNR);
  IF RAMAUS THEN BEGIN
     RMRSET; RMERS(0,0,512,512,100);
     ZOOMF:= MIN2(16, 1280 DIV (4*BEW_B+15));
     RMZOOM(ZOOMF,ZOOMF);
  END;
  IF RAMAUS THEN BEGIN
     IF MAX_NS>NS THEN
        FOR RI:=0 TO 3 DO
           FOR Z:=1 TO MAX_NZ DO
              FOR S:=NS+1 TO MAX_NS DO BEGIN
                 IFELD[1,RI,Z,S]:=100;
                 IFELD[2,RI,Z,S]:=100;
              END;
     IF MAX_NZ>NZ THEN
        FOR RI:=0 TO 3 DO
           FOR Z:=NZ+1 TO MAX_NZ DO
              FOR S:=1 TO MAX_NS DO BEGIN
                 IFELD[1,RI,Z,S]:=100;
                 IFELD[2,RI,Z,S]:=100;
              END;
  END;
  BEGIN
     IF NOT ALLE THEN
        MUSTEREINLESEN(WISHNR);
     IF WISHNR=0 THEN KLASSE:=1
     ELSE KLASSE:=WISHNR;
     REPEAT
        WRITELN('KLASSE',KLASSE:4);
        BELOHNUNGEN;
        LM_ZEIGEN(KLASSE,BEW_B,BEW_H);
        LMFILE_SCHREIBEN(KLASSE);
        KLASSE:=KLASSE+1;
     UNTIL (KLASSE>K) OR (WISHNR>0);
     ABZ_FILE_SCHREIBEN;

{
     IF RAMAUS THEN
     REPEAT
        WRITE('SBEW-MATR ZEIGEN FUER KL1 KL2 ( 0 0 = ENDE ) : ');
        READLN(KL1,KL2);
        IF KL1<>KL2 THEN BEGIN
           ZOOMF:= MIN2(16, 1024 DIV (4*NZ+10));
           RMZOOM(ZOOMF,ZOOMF);
           IF NOT (WISHNR=0) THEN BEGIN
              LMLESEN(KL1); LMLESEN(KL2);
```

```
        END;
        SBEW_ZEIGEN(KL1,KL2);
      END;
    UNTIL KL1=KL2;
}
  END;

END.

{ ===========================================================

ERZEUGT ZU EINEM BILD (SCHWARZ AUF WEISS/ VERDUENNT)
  ZUGEHOERIGE KANTENRICHTUNGEN
  ( FILE ENTHALTEND DIE DREIER-RICHTUNGEN (*30) )

===========================================================}

CONST
     MAXZEILE  = 128;
     MAXSPALTE = 128;
     BLLAENGE  = 512;

TYPE
     UBYTETYP= [BYTE] 0..255;
     BYTETYP = [BYTE] -128..127;
     TNAME   = VARYING[50] OF CHAR;
     TNACHB  = ARRAY [0..7] OF INTEGER;
     WEIGHTS = ARRAY [0..3] OF TNACHB;
     XYKOORD = ARRAY[1..2] OF BYTETYP;
     RIFTYP  = ARRAY[0..7,0..7] OF UBYTETYP;
     TZEILE  = ARRAY[0..MAXSPALTE+1] OF UBYTETYP;

VAR
     BILD,R            : PACKED ARRAY[0..MAXZEILE+1] OF TZEILE;
     N                 : TNACHB;
     RIF               : RIFTYP;
     GHIST             : ARRAY[0..MAXZEILE+1] OF INTEGER;
     MAXGRAD,
     T,WE,
     GLOBMAXGRAD,
     EBENE,NSUM,
     ORT1,ORT2,
     WISH,RZW,GZW,CHZW,
     LASTRI,BESTRI,
     Z,S,I,ZOOMF,
     ZZAHL,SZAHL,
     MINZ,MINS,
     MAXZ,MAXS         : INTEGER;
     CMR               : REAL;
     W                 : WEIGHTS;
     OK,
     RAMAUS            : BOOLEAN;
     RICNAME,NAME,INFILE,
     GRADNAME,OUTNAME  : TNAME;
     OUTFILE,BILDEIN,RICFILE : TEXT;
     DELTA             : ARRAY[0..7] OF XYKOORD;

VALUE
  W[0]:=(0,-1,-1,-1,0,1,1,1);
  W[1]:=(1,0,-1,-1,-1,0,1,1);
  W[2]:=(1,1,0,-1,-1,-1,0,1);
  W[3]:=(1,1,1,0,-1,-1,-1,0);
  DELTA[0]:= (1,0);
  DELTA[1]:= (1,-1);
  DELTA[2]:= (0,-1);
  DELTA[3]:= (-1,-1);
  DELTA[4]:= (-1,0);
  DELTA[5]:= (-1,1);
  DELTA[6]:= (0,1);
  DELTA[7]:= (1,1);
  RIF[0]:= (0,0,0,8,1,2,0,0);
  RIF[1]:= (0,0,0,1,2,3,4,5);
  RIF[2]:= (0,0,0,0,0,4,5,6);
```

```
    RIF[3]:= (8,1,0,0,0,5,6,7);
    RIF[4]:= (1,2,0,0,0,0,0,8);
    RIF[5]:= (2,3,4,5,0,0,0,1);
    RIF[6]:= (0,4,5,6,0,0,0,0);
    RIF[7]:= (0,5,6,7,8,1,0,0);

TYPE
    ZEILE = PACKED ARRAY[1..BLLAENGE] OF CHAR;
    TIHEAD = ARRAY[1..256] OF INTEGER;
VAR
    P1 : INTEGER;
    HILF : ZEILE;
    IHEAD : TIHEAD;

PROCEDURE HEADCI(HILF : ZEILE; VAR IHEAD : TIHEAD; NDIM : INTEGER);
        EXTERN;

PROCEDURE HEADIC(IHEAD : TIHEAD; VAR HILF : ZEILE; NDIM : INTEGER);
        EXTERN;

PROCEDURE RAMTEK;
BEGIN
        RMINIT; RMLVLT; RMRSET;
        WRITE('ZOOMFAKTOR: ');
        READLN(ZOOMF);
        RMZOOM(ZOOMF,ZOOMF);
END;

PROCEDURE BILDEINLESEN;
VAR  NORMAL: BOOLEAN;
BEGIN
    WRITE('IST DAS BILD SCHWARZ AUF WEISS (T/F) ? ');
    READLN(NORMAL);
    WRITELN('BILD WIRD VOM FILE GELESEN');
    OPEN(BILDEIN,INFILE,READONLY,BLLAENGE,SEQUENTIAL,FIXED,NOCARRIAGE);
    RESET(BILDEIN);
    READLN(BILDEIN,HILF);

HEADCI(HILF,IHEAD,128);
    SZAHL := IHEAD[1];
    ZZAHL := IHEAD[2];
    EBENE := IHEAD[3];

FOR Z := 1 TO ZZAHL DO
    BEGIN
        READLN(BILDEIN,HILF);
        FOR S := 1 TO SZAHL DO
        BEGIN
            IF NORMAL THEN
                P1 := (255-ORD(HILF[S])) DIV 255
            ELSE
                P1 := (ORD(HILF[S])) DIV 255;
            BILD[Z,S] := P1;
        END;
    END;
        CLOSE(BILDEIN);
    END;

FUNCTION MIN3(V1,V2,V3: INTEGER): INTEGER;
    BEGIN
      IF (V1<=V2) AND (V1<=V3) THEN MIN3:=V1
      ELSE
        IF (V2<=V1) AND (V2<=V3) THEN MIN3:=V2
        ELSE
          MIN3:=V3;
    END;

PROCEDURE BILDAUSLESEN;
```

```
BEGIN
    OPEN(OUTFILE,OUTNAME,NEW,BLLAENGE,SEQUENTIAL,FIXED,NOCARRIAGE);
    REWRITE(OUTFILE);

IHEAD[1] := SZAHL;
    IHEAD[2] := ZZAHL;
    IHEAD[3] := EBENE;
    HEADIC(IHEAD,HILF,128);
    WRITELN(OUTFILE,HILF);

FOR Z := 1 TO ZZAHL DO
    BEGIN
         FOR S := 1 TO SZAHL DO
           BEGIN
              HILF[S] := CHR(R[Z,S]*30);
           END;
         WRITELN(OUTFILE,HILF)
    END;
    CLOSE(OUTFILE);
END;

FUNCTION IN_BOUNDS(Z,S: INTEGER): BOOLEAN;
BEGIN
   IF (Z>=1) AND (Z<=ZZAHL) AND (S>=1) AND (S<=SZAHL) THEN
     IN_BOUNDS:=TRUE
   ELSE
     IN_BOUNDS:=FALSE;
END;

PROCEDURE NACHB_EINLESEN;
VAR I: INTEGER;
BEGIN
  NSUM:=0;
  FOR I:=0 TO 7 DO
    BEGIN
       IF IN_BOUNDS(Z+DELTA[I,2],S+DELTA[I,1]) THEN
         N[I]:= BILD[Z+DELTA[I,2],S+DELTA[I,1]]
       ELSE
         N[I]:= 0;
       NSUM:= NSUM+N[I];
    END;
END;

PROCEDURE DREIER;
VAR
   DX,DY,R1, R2   : INTEGER;
   H              : ARRAY[0..8] OF INTEGER;
BEGIN
  WRITELN('DREIER SUCHEN & RICHTUNG ZUORDNEN');
  FOR I:=0 TO 8 DO H[I]:=0;
  FOR Z:=1 TO ZZAHL DO
    FOR S:=1 TO SZAHL DO
      BEGIN
        R[Z,S]:=0;
        IF BILD[Z,S]=1 THEN
          BEGIN
            NACHB_EINLESEN;
            IF NSUM>2 THEN BEGIN  { 5*5 UMGEBUNG EINER KREUZUNG LOESCHEN }
              FOR DY:=-2 TO 2 DO
                FOR DX:=-2 TO 2 DO BEGIN
                   BILD[Z+DY,S+DX]:=0;
                   R[Z+DY,S+DX]:=0;
                END;
            END;
            IF NSUM=2 THEN
              BEGIN
{                FOR I:=0 TO 7 DO WRITE(N[I]:4); WRITELN;  }
                R1:=0;
                WHILE N[R1]=0 DO
                   R1:=R1+1;
                R2:=R1;
                REPEAT
                   R2:=R2+1;
```

```
                    UNTIL N[R2]<>0;
                    R[Z,S]:= RIF[R1,R2];
                    H[R[Z,S]]:= H[R[Z,S]]+1;
                 END;
              IF NSUM=1 THEN
                 BEGIN
                    R1:=0;
                    WHILE N[R1]=0 DO
                       R1:=R1+1;
                    R2:= (R1+4) MOD 8;
                    R[Z,S]:= RIF[R1,R2];
                    H[R[Z,S]]:= H[R[Z,S]]+1;
                 END;
            END;
      END;
   WRITELN('HAEUFIGKEIT DER DREIER-RICHTUNGEN:');
   FOR I:=0 TO 8 DO
      WRITELN(I:2,H[I]:8);
END;

PROCEDURE GLAETTUNG;
VAR
   FIRSTRI,I,GANZ, DX,DY,R1, R2    : INTEGER;
BEGIN
   GANZ:=0;
   FOR Z:=1 TO ZZAHL DO
      FOR S:=1 TO SZAHL DO
         BEGIN
            IF R[Z,S]>0 THEN
               BEGIN
                  R1:=R[Z,S];
                  FOR DY:=-1 TO 1 DO
                  FOR DX:=-1 TO 1 DO BEGIN
                     R2:=R[Z+DY,S+DX];
                     IF R2>0 THEN
                       IF (ABS(R1-R2)>1) AND (ABS(R1-R2)<7) THEN BEGIN
{                         WRITELN('Z,S,R1,R2:',Z:4,S:4,R1:4,R2:4);   }
                          R[Z,S]:=0; R[Z+DY,S+DX]:=0; GANZ:=GANZ+2;
                       END;
                  END;
               END;
         END;
WRITELN('GELOESCHT WEGEN STARKER RICHTGS-AENDERUNG:',GANZ:7);

GANZ:=0;
FOR Z:=1 TO ZZAHL DO
   FOR S:=1 TO SZAHL DO
      BEGIN
         IF R[Z,S]<>0 THEN
            BEGIN
               NSUM:=0;
               FOR DY:=-1 TO 1 DO
               FOR DX:=-1 TO 1 DO
                 IF (DX<>0) OR (DY<>0) THEN
                   BEGIN
                      IF IN_BOUNDS(Z+DY,S+DX) THEN
                         R1:= R[Z+DY,S+DX]
                      ELSE
                         R1:= 0;
                      IF R1>0 THEN BEGIN
                         NSUM:= NSUM+1;
                         IF NSUM=1 THEN FIRSTRI:=R1;
                         IF NSUM=2 THEN
                            IF FIRSTRI=R1 THEN
                               IF R[Z,S]<>FIRSTRI THEN BEGIN
                                  GANZ:=GANZ+1;
                                  R[Z,S]:=FIRSTRI;
                               END;
                      END;
                   END;
            END;
      END;
WRITELN('GEAENDERT WEGEN UMZINGELUNG MIT EINER ANDEREN RICHTUNG:',GANZ:7);
END;
```

```
BEGIN
    WRITE('NAME DES EINGABE-BINAER-BILDES: ');
    READLN(NAME);
    INFILE:=NAME;
    BILDEINLESEN;
    DREIER; GLAETTUNG;
    WRITE('NAME DES AUSGABEFILES: (F FALLS IDENTISCH) ');
    READLN(NAME);
    IF (NAME<>'F') AND (NAME<>'f') THEN
        OUTNAME:=NAME
    ELSE
        OUTNAME:=INFILE;
    BILDAUSLESEN;
END.
```

What is claimed is:

1. Method for recognizing previously localized characters present in digital gray tone images, particularly for recognizing characters struck into metal surfaces, for training a trainable character recognition means for recognizing the localizing characters, comprising the steps of:

generating at least one or more reference characters having a plurality of pixels and portrayed line-like and storing these reference characters in a working memory of the trainable character recognition means, whereby the number and nature of the reference characters correspond to a character set from which the localized characters are to be recognized;

assigning a direction to every pixel of every reference character;

determining a scatter function for the directions assigned to pixels of every reference character;

determining an angular comparison function for comparing reference directions with gray tone edge directions identified from a gray tone image of the localized characters; and producing evaluation matrices on the basis of the scatter function and of the angular comparison function;

and for recognizing characters, the method further comprising the steps of:

reading a digitized and localized character to be recognized into the character recognition means, and providing therefrom an appertaining gray tone image;

pre-processing the character to be recognized using at least the appertaining gray tone image so that a classification of the appertaining character can be implemented;

comparing the pre-processed character to all reference characters previously learned by the character recognition means;

using a majority decision for determination of a reference character that most closely coincides to the character to be recognized; and generating a result signal, indicative of the majority decision, from the character recognition means for further processing.

2. The method according to claim 1, wherein the generated result signal is subjected to a plausibility check; and wherein a signal that represents a rejection criteria is generated for the absence of a positive check result.

3. The method according to claim 2, wherein the rejection criterion is met when at least one of the following two conditions occurs:

1) the value Vgl(B)/AV is smaller than a threshold Rs1, whereby B is the result character of a classification and whereby AV is the number of foreground points of an appertaining, binarized gradient image;

2) the minimum distance of an evaluation of the result character B to other characters is lower than a threshold Rs2.

4. The method according to claim 3, wherein the distance function for the condition "2" is established by $$g(Vgl(A), Vgl(B)) := \frac{|Vgl(A) - Vgl(B)|}{|Vgl(A)| + |Vgl(B)|}.$$

5. The method according to claim 1, wherein the character to be recognized is further-processed in a rectangle segmented from the gray tone image; wherein the intensity and direction of a potential gray value edge in the rectangle is first calculated for every point of this rectangle with a gradient filter; and wherein the orientation of the gray value edges ("from bright to dark" or "from dark to bright") is not discriminated, since coined edges in the gray tone image which appear bright and which appear dark cannot be predicted for an unknown illumination direction.

6. The method according to claim 5, wherein a compass gradient filter is used as the gradient filter.

7. The method according to claim 6, wherein a gradient image present after the gradient filtering is transformed into a binary image; and wherein pixels of the gradient image having weak gradient values are erased.

8. The method according to claim 7, wherein the binarized gradient image is transformed to a format "RefBreite*RefHöhe" of the reference characters.

9. The method according to claim 1, wherein predetermined steps of the comparison procedure can be executed essentially in parallel.

10. Method for recognizing previously localized characters present in digital gray tone images, for training a trainable character recognition means for recognizing the localized characters, comprising the steps of:

generating at least one or more reference characters having a plurality of pixels and portrayed line-like and storing these reference characters in a working memory of the trainable character recognition means, whereby the number and nature of the reference characters correspond to a character set from which the localized characters are to be recognized;

assigning a direction to every pixel of every reference character;

determining a scatter function for the directions assigned to pixels of every reference character;

determining an angular comparison function for comparing reference directions with gray tone edge directions identified from a gray tone image of the localized characters; and producing evaluation matrices on the basis of the scatter function and of the angular comparison function;

and for recognizing characters, the method further comprising the steps of:

reading a digitized character of a localized character to be recognized into the character recognition means, and providing therefrom an appertaining gray tone image;

pre-processing the character to be recognized at least using the appertaining gray tone image so that a classification of the appertaining character can be implemented;

comparing the pre-processed character to all reference characters previously learned by the character recognition means;

using a majority decision for determination of a reference character that most closely coincides to the character to be recognized;

generating a result signal, indicative of the majority decision, from the character recognition means for further processing;

subjecting the generated result signal to a plausibility check; and generating a signal that represents a rejection criteria for the absence of a positive check result, the rejection criterion being met when at least one of the following two conditions occurs:

1) a value Vg1(B)/AV is smaller than a threshold Rs1, B being a result character of a classification and AV being the plurality of foreground points of an appertaining, binarized gradient image;

2) the minimum distance of an evaluation of the result character B to other characters is lower than a threshold Rs2.

11. The method according to claim 10, wherein the distance function for the condition "2" is established by $$g(Vg1(A), Vg1(B)) := \frac{|Vg1(A) - Vg1(B)|}{|Vg1(A)| + |Vg1(B)|}.$$

12. Method for recognizing previously localized characters struck into metal surfaces and present in digital gray tone images, for training a trainable character recognition means for recognizing the localizing characters, comprising the steps of:

generating at least one or more reference characters having a plurality of pixels and portrayed line-like and storing these reference characters in a working memory of the trainable character recognition means, whereby the number and nature of the reference characters correspond to a character set from which the localized characters are to be recognized;

assigning a direction to every pixel of every reference character;

determining a scatter function for the distance assigned to pixels of every reference character;

determining an angular comparison function for comparing reference directions with gray tone edge directions identified from the gray tone image of the localized characters; and producing evaluation matrices on the basis of the scatter function and of the angular comparison function;

and for recognizing characters, the method further comprising the steps of:

reading a digitized character of a localized character to be recognized into the character recognition means, and providing therefrom an appertaining gray tone image;

pre-processing the character to be recognized at least using the appertaining gray tone image so that a classification of the appertaining character can be implemented;

comparing the pre-processed character to all reference characters previously learned by the character recognition means;

using a majority decision for determination of a reference character that most closely coincides to the character to be recognized;

generating a result signal, indicative of the majority decision, from the character recognition means for further processing;

further-processing the character to be recognized in a rectangle segmented from the gray tone image, the intensity and direction of a potential gray value edge in the rectangle being first calculated for every point of this rectangle with a gradient filter and the orientation of the gray value edges ("from bright to dark" or "from dark to bright") being not discriminated, since coined edges in the gray tone image which appear bright and which appear dark cannot be predicted for an unknown illumination direction.

13. The method according to claim 12, wherein a compass gradient filter is used as the gradient filter.

14. The method according to claim 12, wherein a gradient image present after the gradient filtering is transformed into a binary image; and wherein pixels of the gradient image having weak gradient values are erased.

15. The method according to claim 12, wherein the binarized gradient image is transformed to a format "RefBreite*RefHöhe" of the reference characters.

* * * * *